April 23, 1957          A. V. HOSE          2,789,483
MACHINE FOR MAKING BOX BLANKS
Original Filed April 27, 1949          14 Sheets-Sheet 1

Inventor
Alexander V. Hose
by Roberts, Cushman & Grover
att'ys.

April 23, 1957　　　A. V. HOSE　　　2,789,483
MACHINE FOR MAKING BOX BLANKS
Original Filed April 27, 1949　　　14 Sheets-Sheet 2

Inventor
Alexander V. Hose
by Roberts, Cushman & Grover
att'ys.

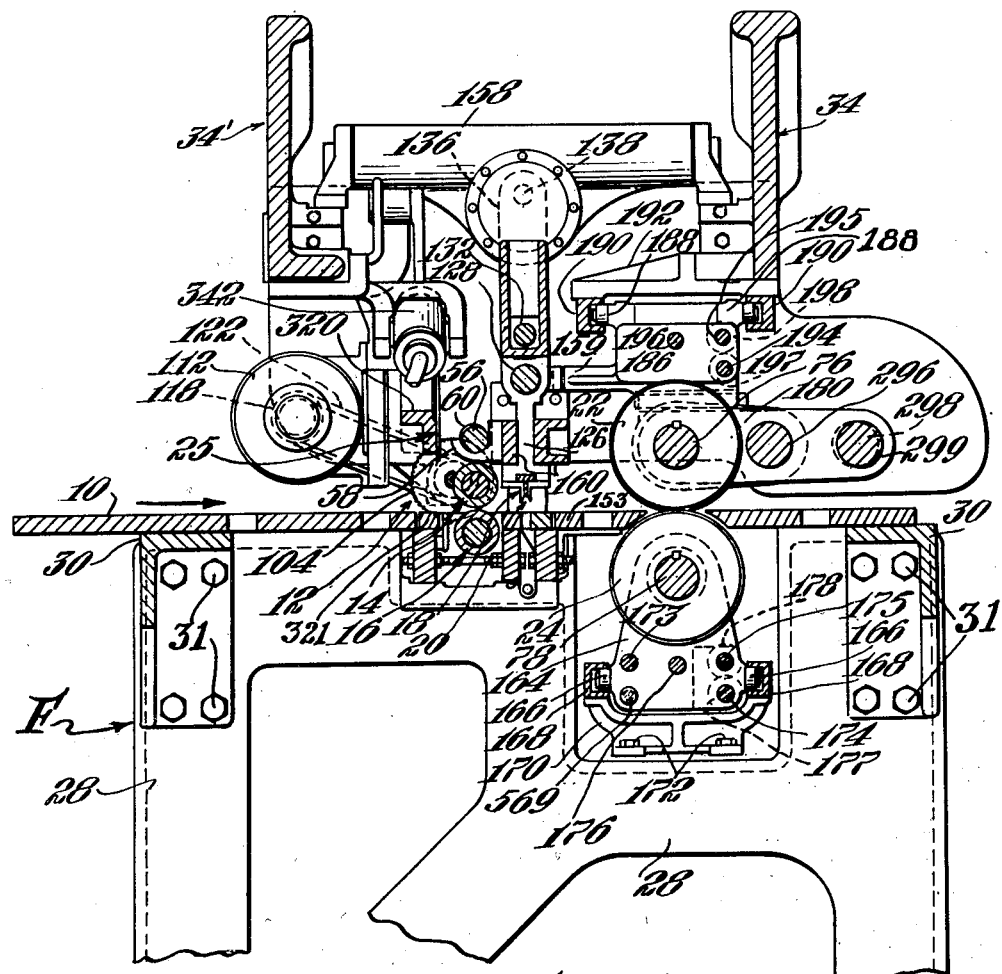
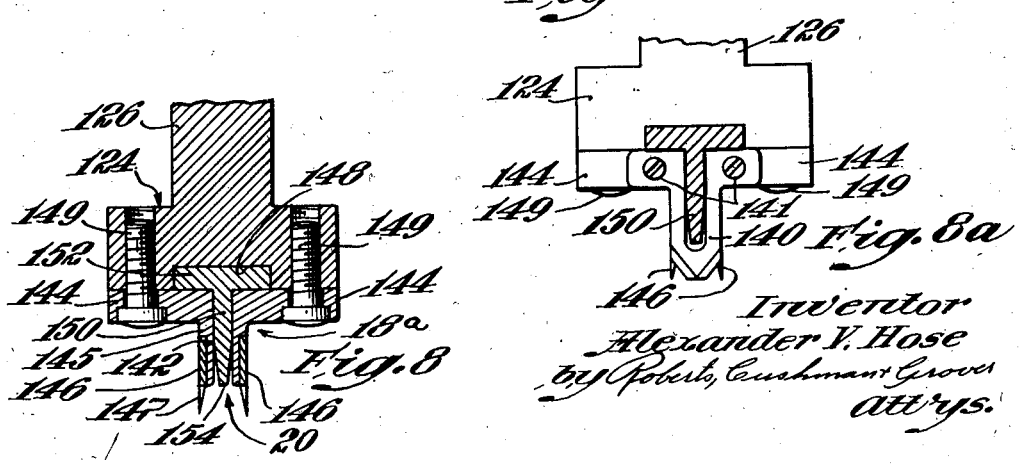

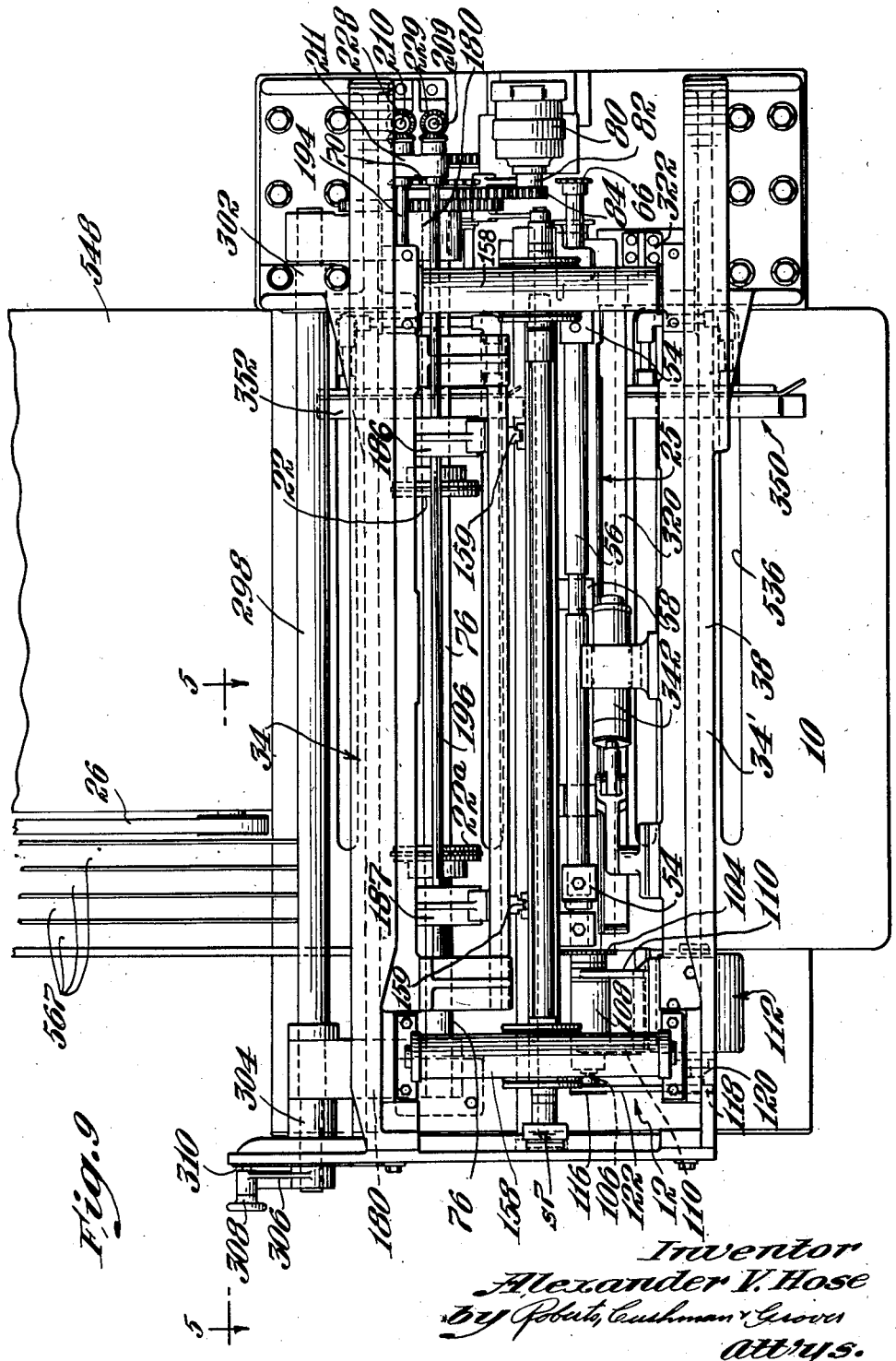

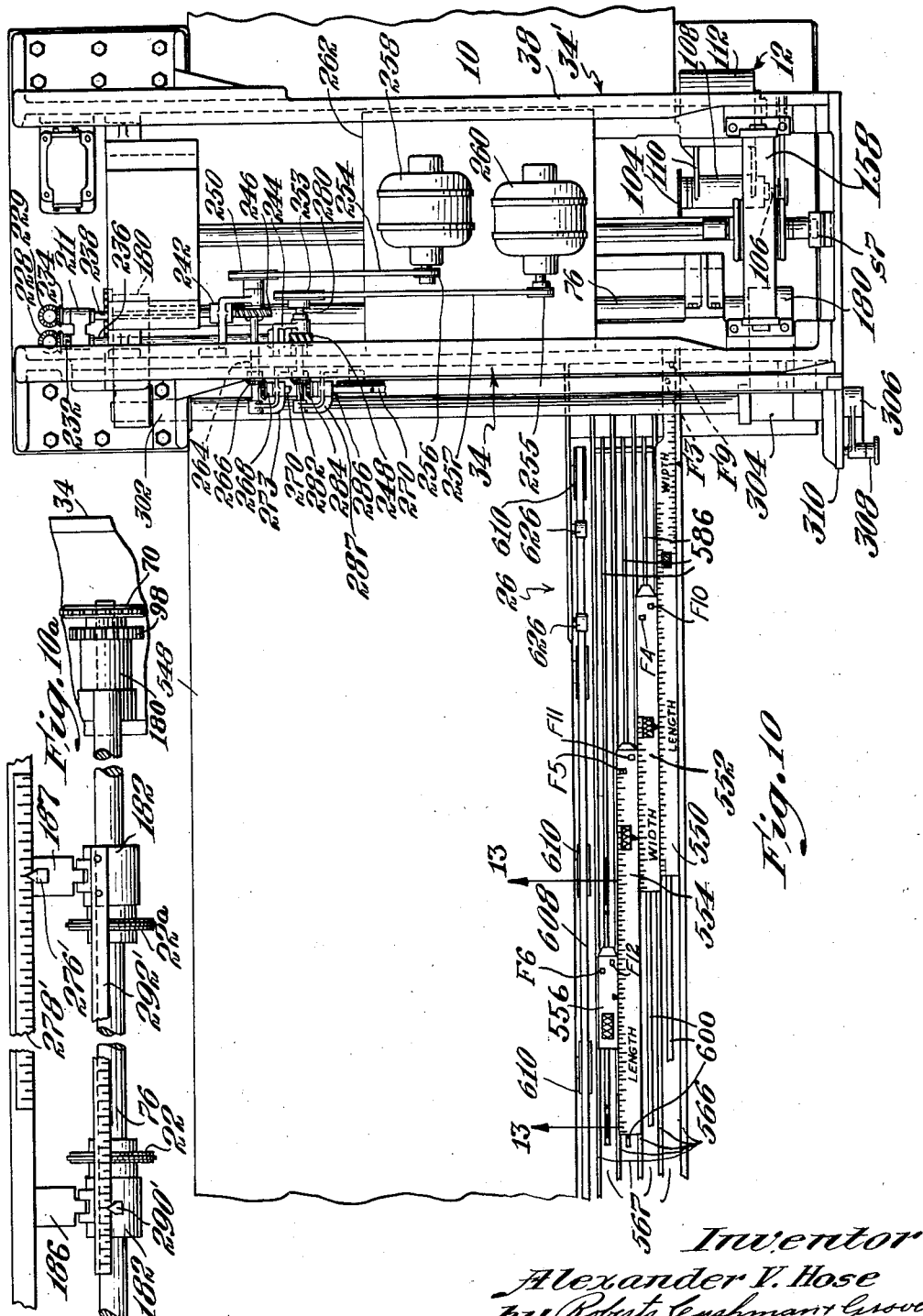

Inventor
Alexander V. Hose

April 23, 1957 A. V. HOSE 2,789,483
MACHINE FOR MAKING BOX BLANKS
Original Filed April 27, 1949 14 Sheets-Sheet 11
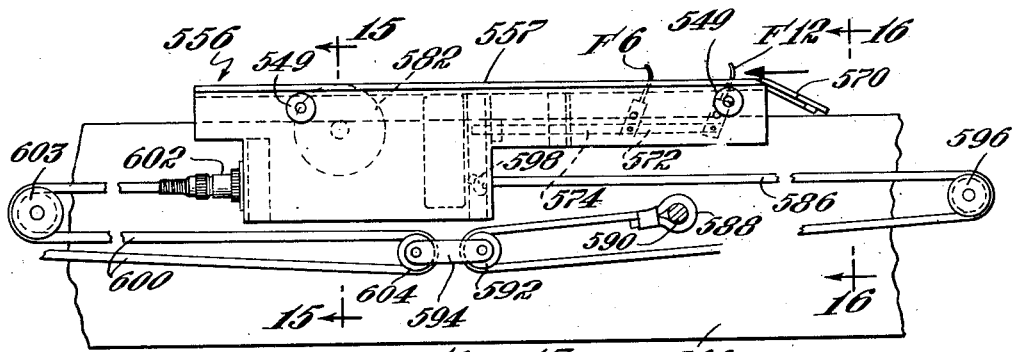
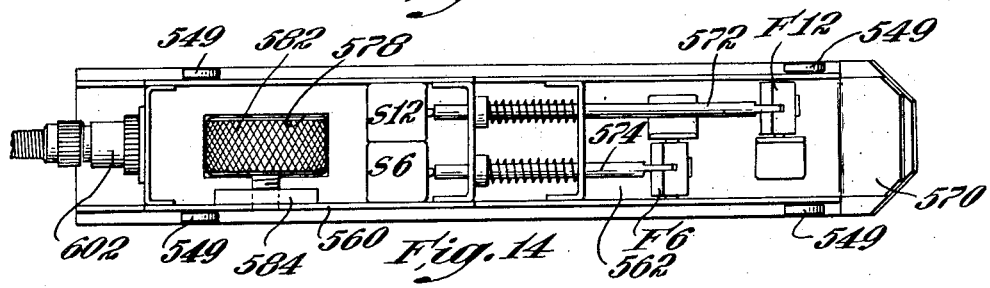
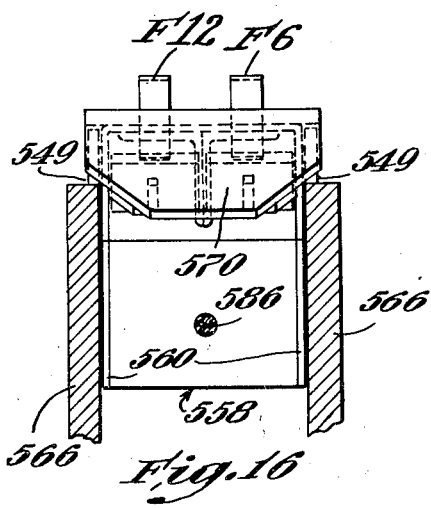
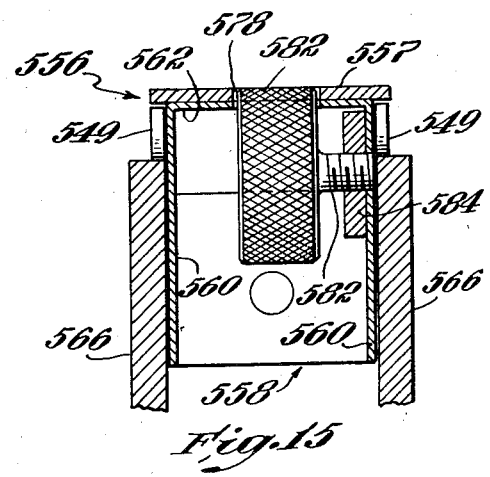
Inventor
Alexander V. Hose
by Roberts, Cushman & Groves
Att'ys.

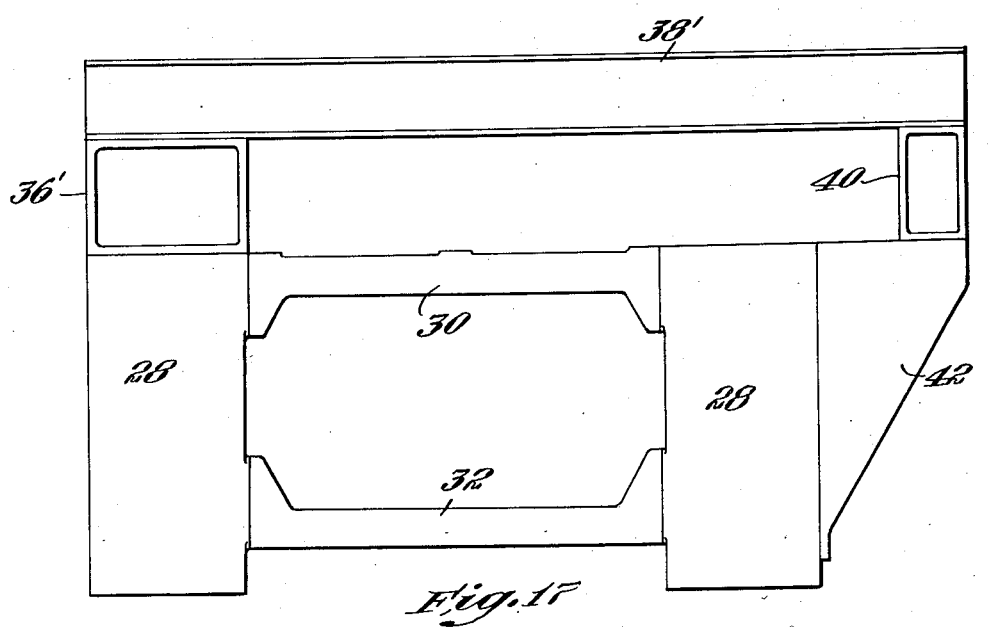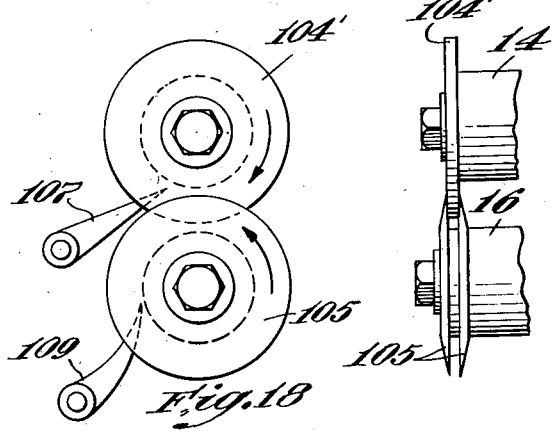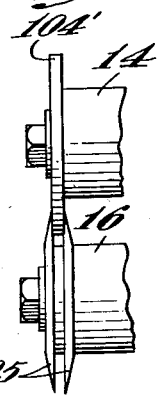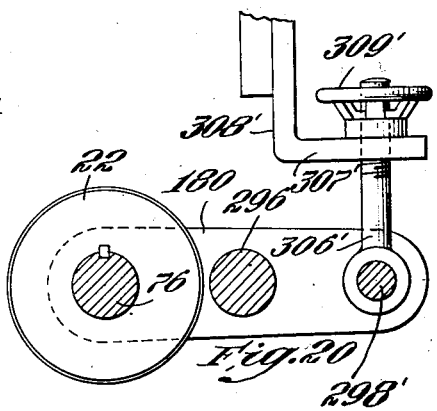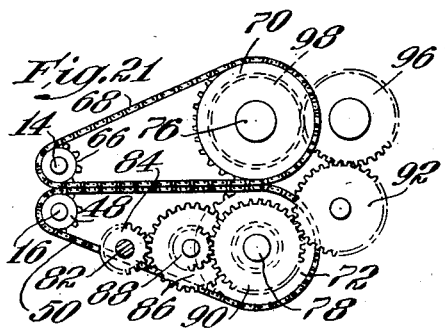

Inventor
Alexander V. Hose
by Roberts, Cushman + Grover
att'ys.

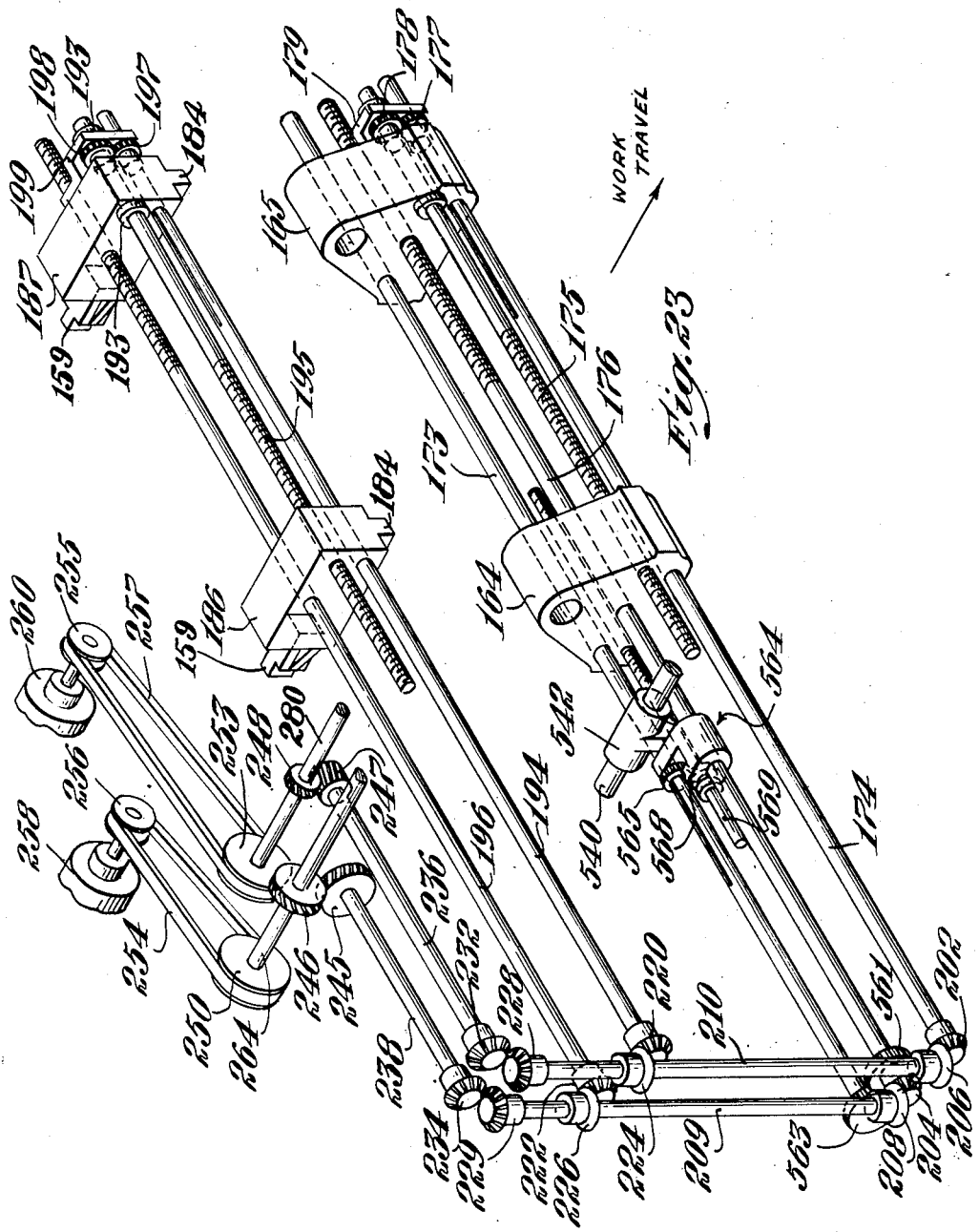

United States Patent Office 2,789,483
Patented Apr. 23, 1957

2,789,483

MACHINE FOR MAKING BOX BLANKS

Alexander V. Hose, Marblehead, Mass., assignor, by mesne assignments, to Colt's Patent Fire Arms Manufacturing Company, Incorporated, Hartford, Conn., a corporation of Delaware Continuation of abandoned application Serial No. 89,961, April 27, 1949. This application August 25, 1952, Serial No. 306,279

60 Claims. (Cl. 93—58)

This application is a continuation of my copending application for Machine for Making Box Blanks, Serial No. 89,961, filed April 27, 1949, allowed February 28, 1952, and now abandoned.

The general object of this invention is to provide a semi-automatic machine into which sheet fiberboard may be fed and from which will be successively delivered completely formed box blanks, scored and slotted in the proper places to permit folding of each blank to form the side walls and scored at suitable places so that the end and side flaps at the top and bottom may be folded in to complete a box.

A more specific object of the invention is to provide a machine which may be readily adjusted to make box blanks of any desired size, which is rapid in operation, which may be readily operated by unskilled labor, and which advances the art of box making generally. A machine embodying the invention is particularly adapted for quick adjustment or set-up so that very small quantities of box blanks of any desired size may be made economically.

In a broad aspect the invention contemplates a machine for making blanks for a box from sheet stock, such as fiberboard, which is fed by means such as feed rolls over a pathway in the machine during the manufacturing operation. During the travel of the stock one or more instrumentalities moves relatively to the said pathway to slot and score the stock so as to define the flaps and corners of the box to be formed from the blank. The feeding is preferably stopped during the operation of the said instrumentalities so as to insure clean cuts. The operation of the instrumentalities is effected by means associated with a plurality of gauges, control elements, or switch-actuating means, preferably independently adjustable and calibrated in length and width dimensions of the box so that they may be set in accordance with the desired dimensions of the box to be formed. In one aspect the gauges or the like are longitudinally spaced and located in or adjacent the pathway of the stock strip so that they are operable by the leading edge of the strip or sheet as it passes through the machine.

A further aspect of the invention is the slotting and scoring means which comprise transversely spaced slotting cutters, positioned to form slots extending inwardly from the longitudinal edges of the blank. These slots are joined by transverse score lines made by a scoring bar. The cutters are movable along this scoring bar by means of lead screws so that the depth of the slots and therefore the width and depth of the box to be formed from the blank are controllable. Indexing means preferably graduated in box width and depth may be associated with the driving means for the lead screws moving the cutters.

In a still further aspect an adjustable edge guide is provided which may be moved relatively to a trimming member, for example a saw, by the lead screws associated with the slotting cutters whereby the strip stock is trimmed, as it is fed into the machine, to the proper width for a desired blank size thereby precluding the necessity of precutting the blanks to size.

In another aspect the instrumentalities include cutoff means, such as a knife, to sever the strip clear across so as to determine the overall length of the blanks. Such instrumentality is correlated with and operated in a manner similar to the slotting and scoring means by an additional gauge.

A feature of the invention is the provision of power operated driving means energized, for example by means such as a switch, located forwardly of the feeding means in a position to be tripped by the leading edge of the stock as it is fed into the machine. Supplementary means such as a second switch is situated rearwardly of the first switch a distance appreciably less than the shortest overall length of the blanks to be formed thus assuring continuous operation of the driving means until the blank is completed.

The drive for the feeding means may include a hydraulic motor. When a hydraulic motor is used, liquid is supplied under pressure from a pump, control of the motor being accomplished by electric switches, preferably arranged in pairs and associated with the gauges mentioned above. When the switches are in pairs, the first switch of each pair operates to increase the back pressure in the motor discharge line or conduit, for example by means of a valve or orifice inserted in such conduit, thus retarding the motor and slowing the feeding. The second switch of each pair operates to block the discharge conduit from the motor, for example by means of a shut-off valve, thus stopping the motor and stopping the feeding. Interconnecting means are provided so that the second switch concomitantly actuates the instrumentalities which act upon the sheet or blank. Interlocking switching means operable by the instrumentalities upon the completion of the slotting and scoring cycle open the discharge conduit from the motor thus again moving the strips, starting the motor and resuming the feeding. Other electric switches are operatively correlated with the stopping and resumption of the feeding of the strip or sheet along its path so that the slotting and scoring means are operated to provide the required transverse slots and score lines are spaced at intervals in accordance with the length-width dimensions of the box to be formed.

These and other objects, aspects and features will be apparent from the following description of an illustrative specific embodiment of the invention, shown in the drawings in which.

Figure 2:
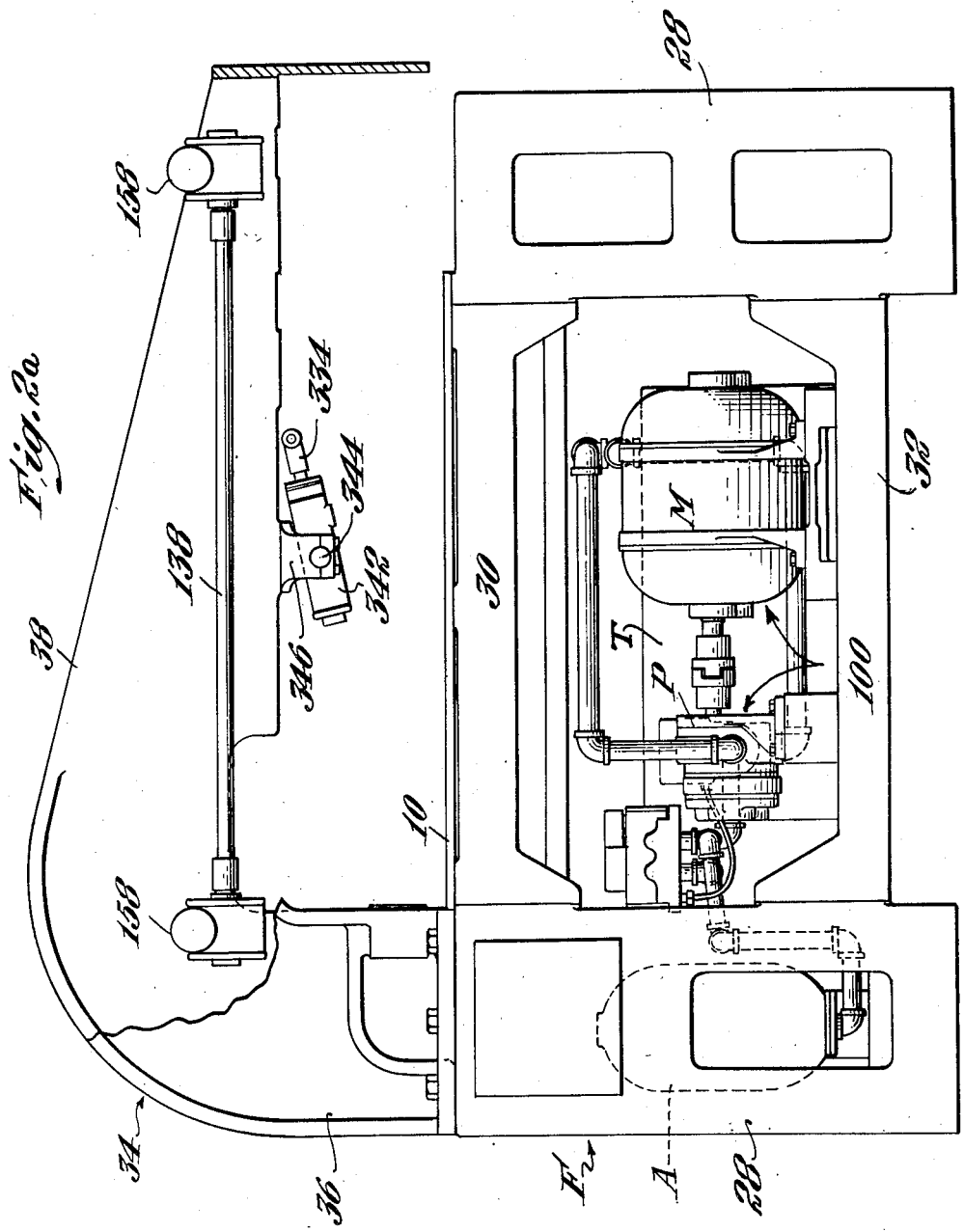
Fig. 2 is a front elevation of the machine.
Figure 3:
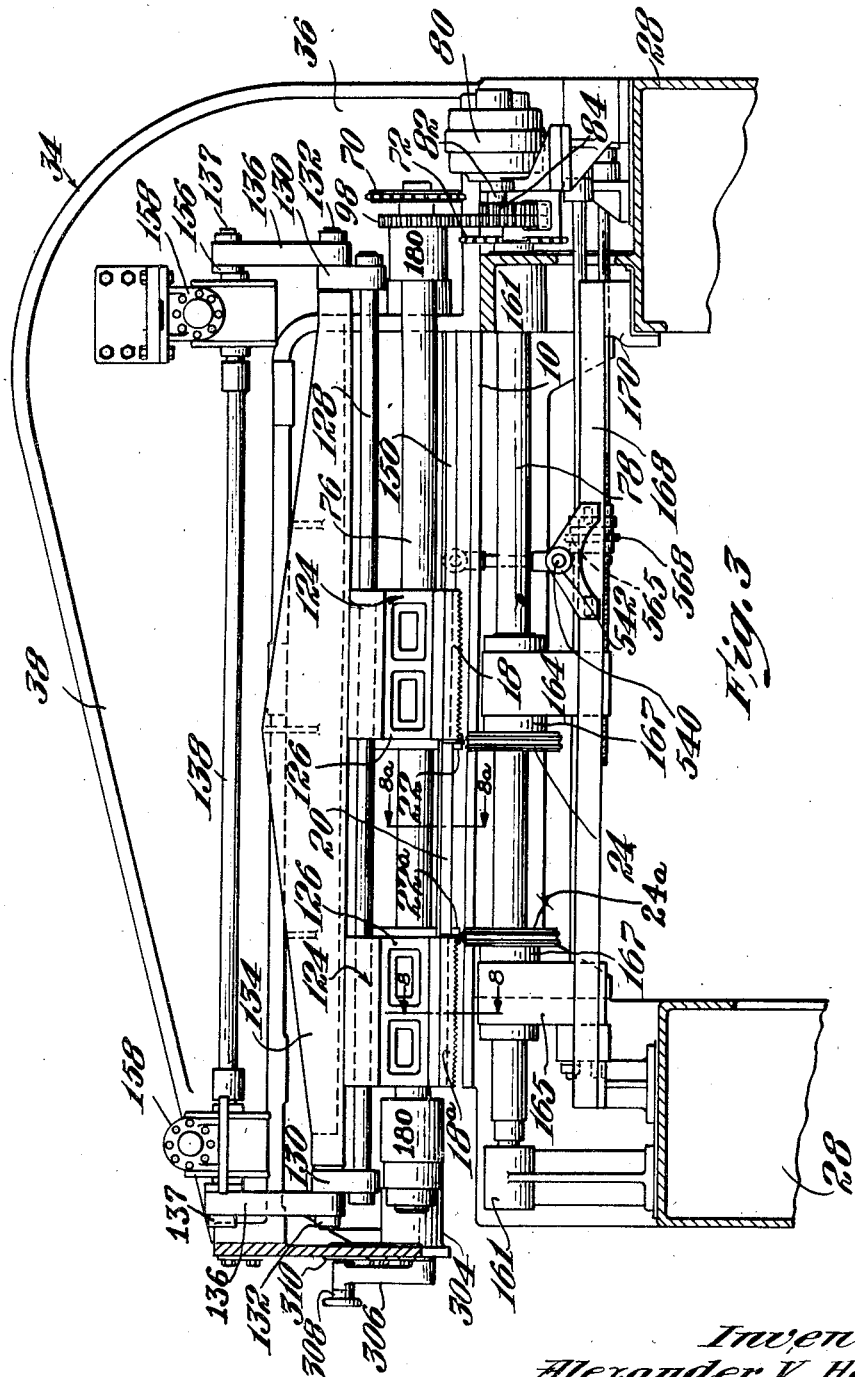
Figure 4:
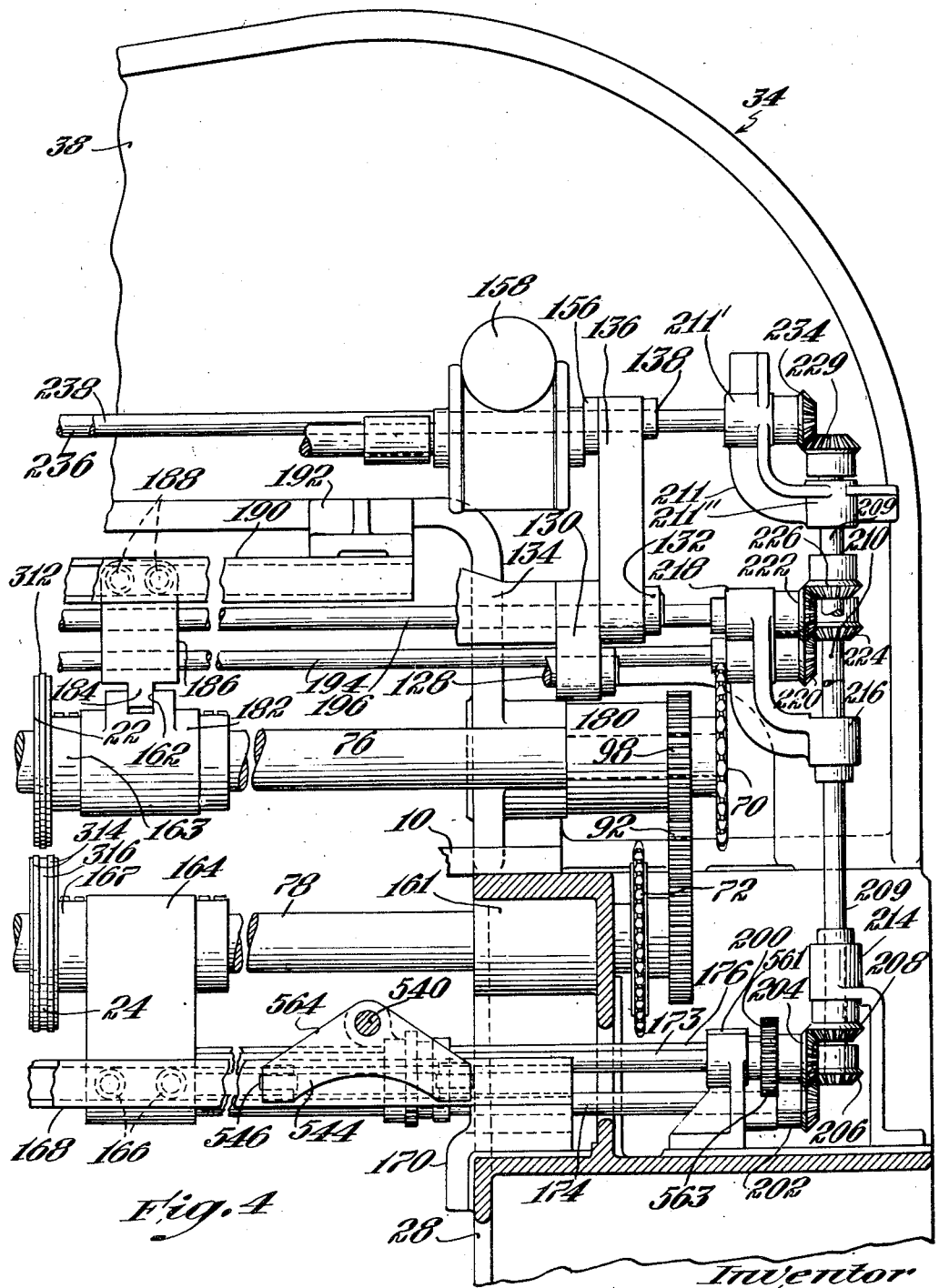
Figure 5:
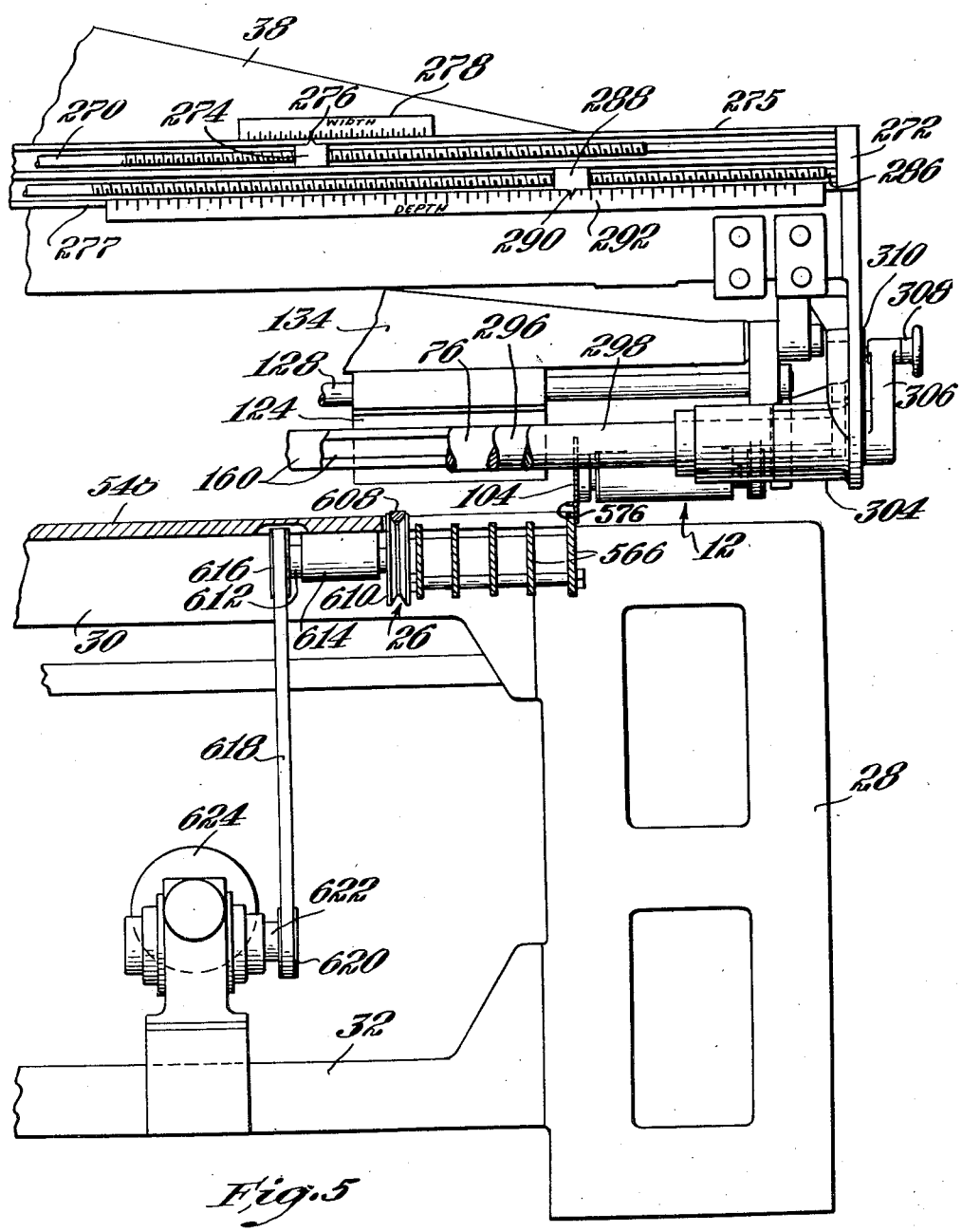
Figure 6:
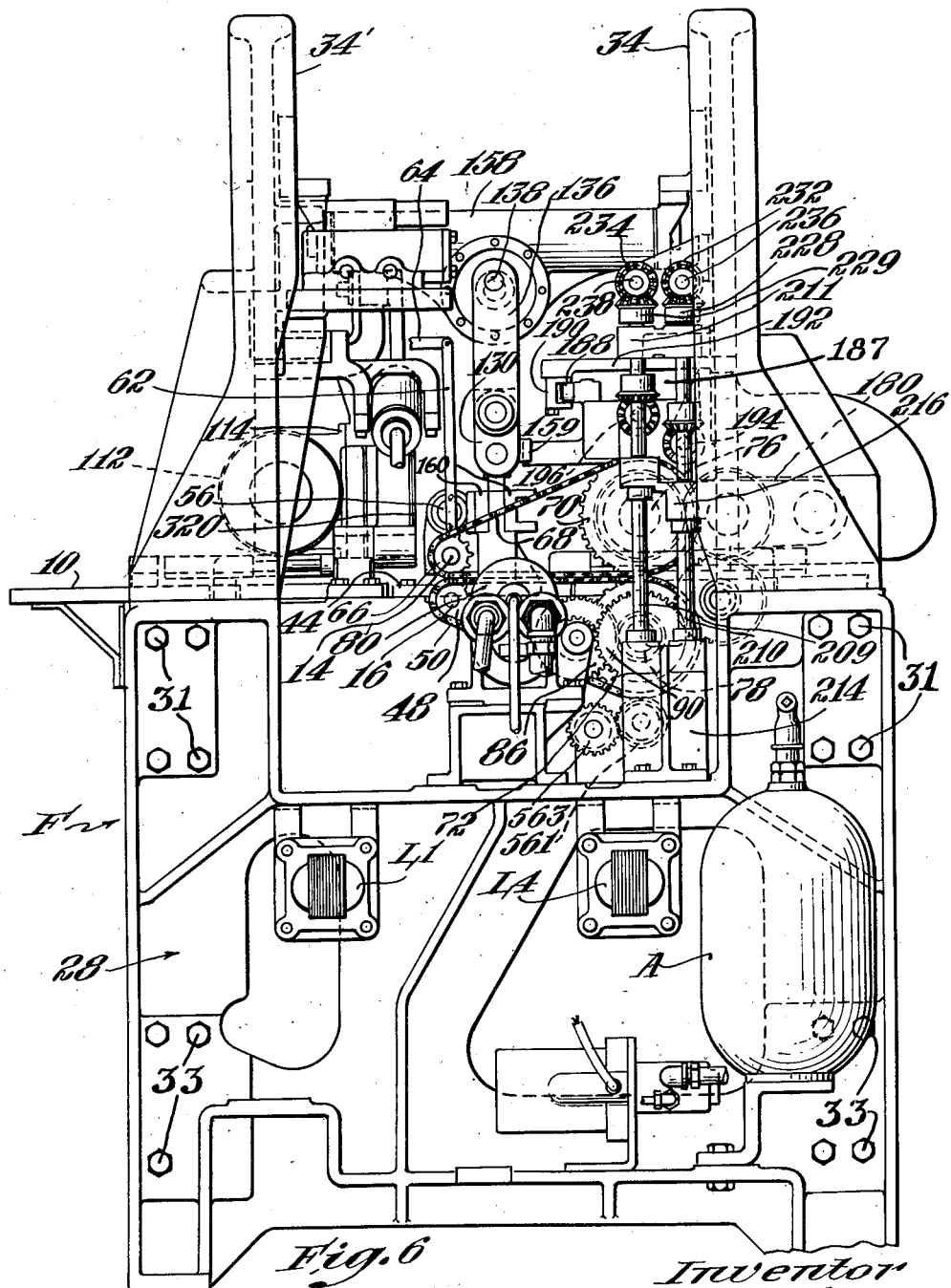
Figure 11:
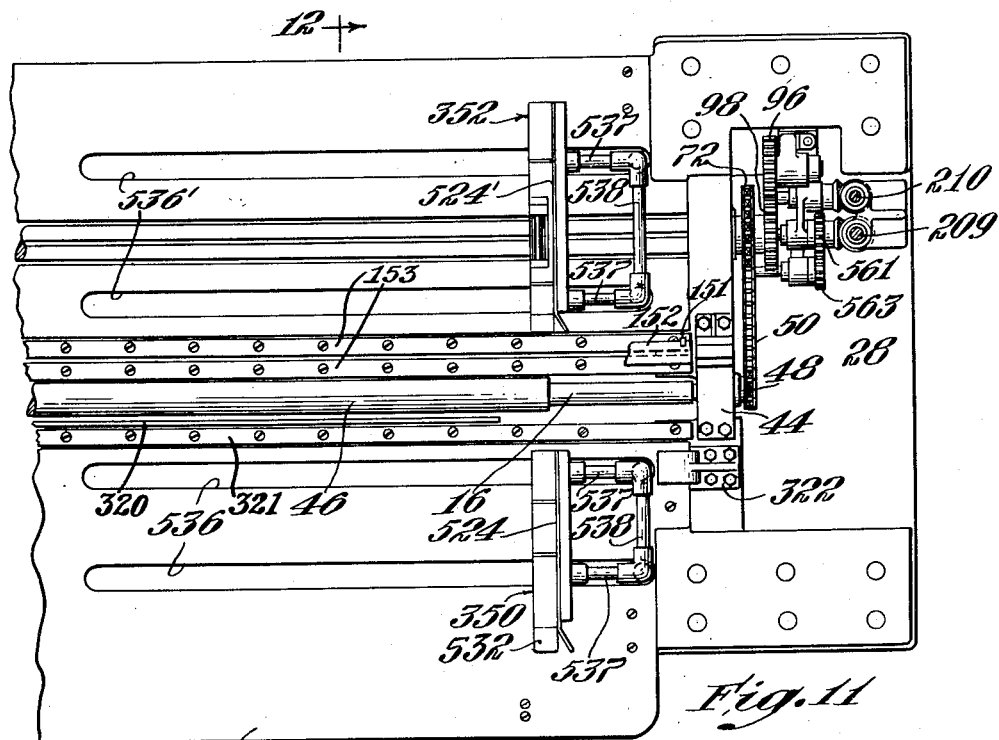
Figure 12:
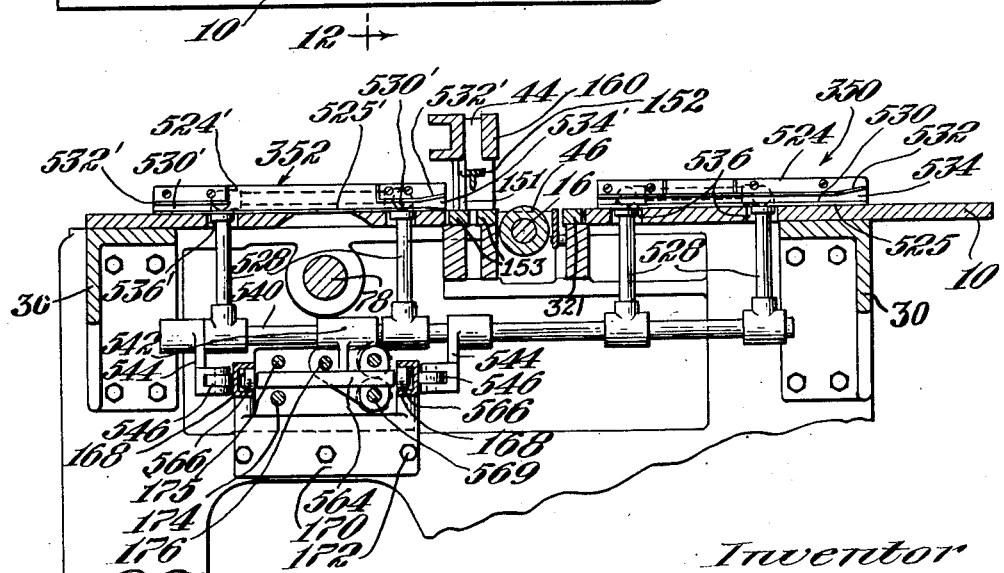
Figure 22:
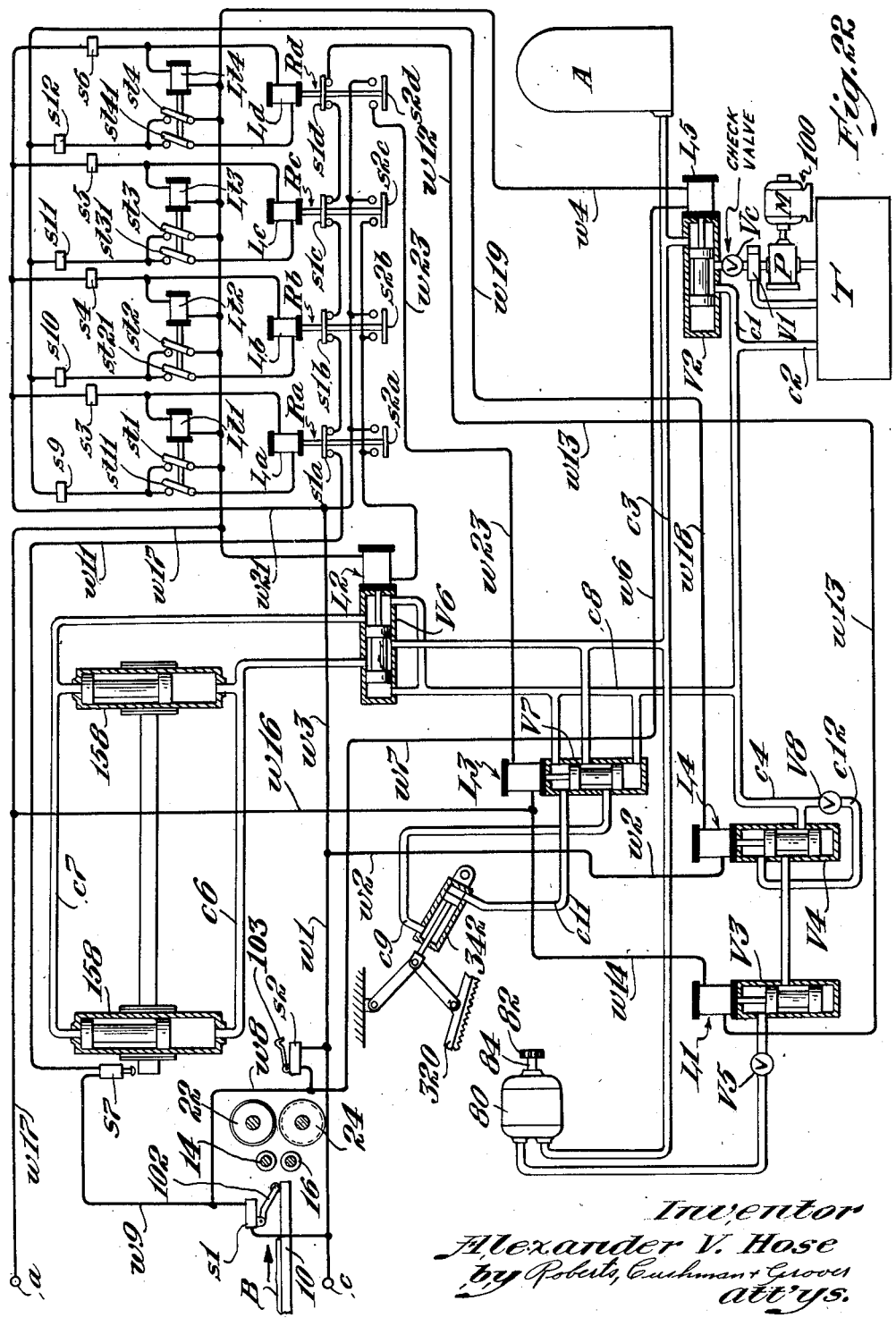

Fig. 2ª is a rear elevation of the machine with certain operating instrumentalities omitted;

Fig. 3 is a front elevation partly in section showing the combined slotting and scoring instrumentalities with the feed rolls and the drive therefor omitted;

Fig. 4 is an enlarged fragmentary front elevation in partial section showing the details of the driving mechanism;

Fig. 5 is an enlarged fragmentary rear view partly in section along the line 5—5 of Fig. 9 and showing the scale means for width and depth and also showing the kickoff conveyor means;

Fig. 6 is an enlarged right side elevation of the machine, certain parts at the rear being omitted;

Fig. 7 is an enlarged fragmentary sectional view taken along the line 7—7 of Fig. 2, certain parts at the rear being omitted;

Fig. 8 is an enlarged fragmentary longitudinal sectional view taken along the line 8—8 of Fig. 3 and showing the details of the combined slotting and scoring means;

Fig. 8ª is an enlarged fragmentary sectional view taken along the line 8ª—8ª of Fig. 3 and showing the knife for cutting the end of the slots;

Fig. 9 is a partial plan view of the machine with the motors for adjusting various parts omitted;

Fig. 10 is a plan view of the machine showing the gauging assemblies in detail;

Fig. 10ª is a fragmentary view similar to Fig. 5 but showing an alternative depth and width gauging means;

Fig. 11 is a fragmentary horizontal sectional view taken along the line 11—11 of Fig. 2;

Fig. 12 is a longitudinal vertical sectional view taken along the line 12—12 of Fig. 11;

Fig. 13 is an enlarged fragmentary elevational view taken along the line 13—13 of Fig. 10;

Fig. 14 is an enlarged bottom view of the mechanism shown in Fig. 13;

Fig. 15 is an enlarged vertical sectional view taken along the line 15—15 of Fig. 13;

Fig. 16 is an enlarged vertical sectional view taken along the line 16—16 of Fig. 13;

Fig. 17 is a rear elevation similar to Fig. 2ª but showing an alternative frame for the machine;

Figs. 18 and 19 are respectively left side and front views, to some extent schematic, showing an alternative trimming means;

Fig. 20 is a detail view showing alternative means for adjusting the vertical spacing of the upper and lower scoring rolls;

Fig. 21 is a detail view of the driving means for the feeding and scoring rolls;

Fig. 22 is a detailed diagram of the hydraulic and electric systems for effecting operation of the machine; and Fig. 23 is an isometric view of the drive for varying the positions of the slotting and scoring means and of the edge guides.

Figure 1:
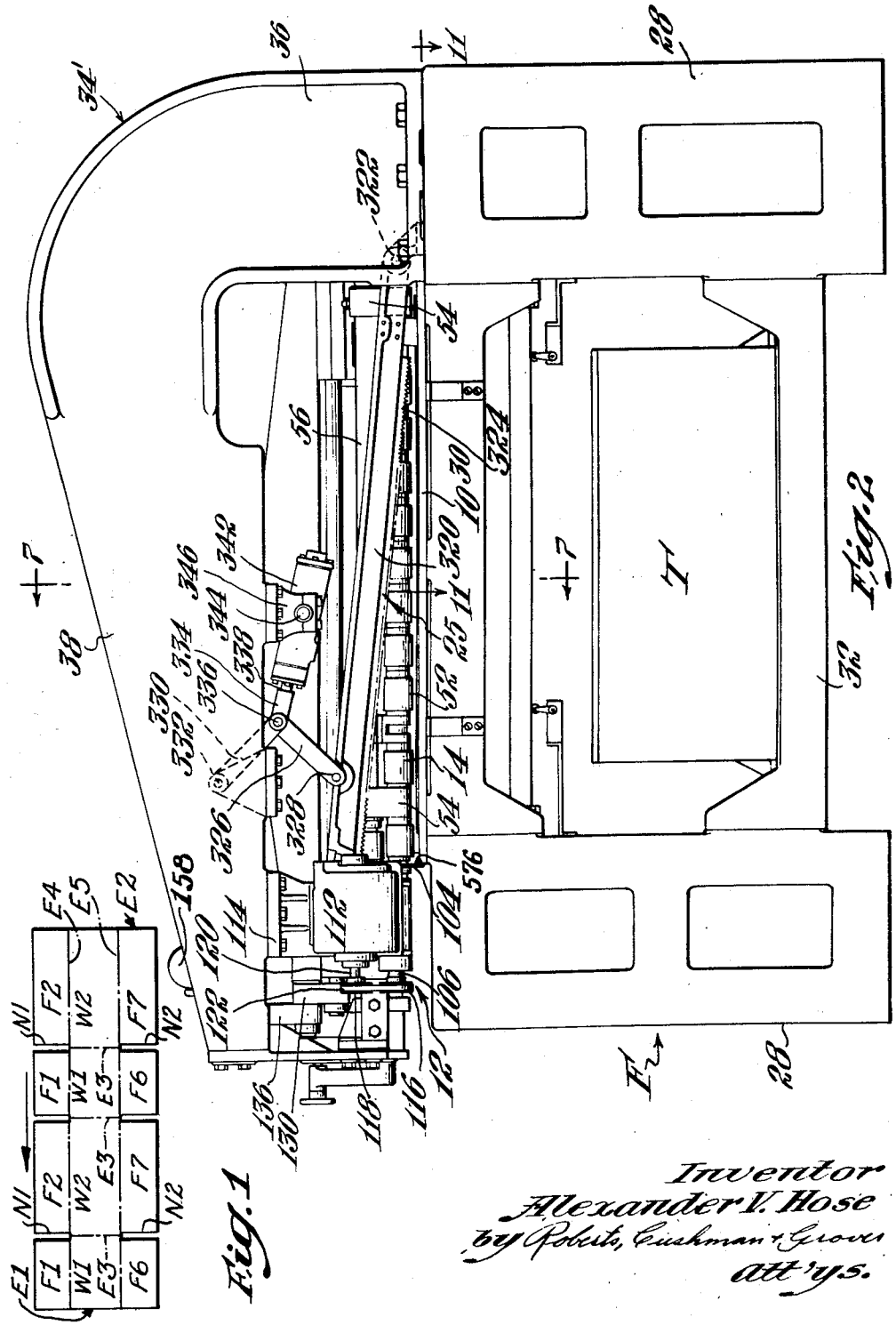
Fig. 1 is a plan view of a finished box blank of the type made by the machine.

Referring to Fig. 1, there is illustrated a box blank B of the kind which is to be made by the present machine. The blank B is formed from a sheet of paper board of the desired weight and strength. The said blank has side and end walls which are shown as having different lengthwise dimensions. The longer walls W2—W2 are designated as side walls and the shorter walls W1—W1 are designated as end walls. Transverse score lines E3 are provided between the immediately adjacent side and end walls. The blank B also has top and bottom flaps F2—F2 and F7—F7 connected with the side walls W2—W2 and top and bottom flaps F1—F1 and F6—F6 connected with the end walls W1—W1. Longitudinal score lines E4 and E5 are provided between the said flaps and the corresponding side and end walls. The top and bottom flaps are divided or separated from each other by top and bottom notches or slots N1—N1 and N2—N2 extending transversely inwardly from longitudinal edges of the blank to the longitudinal score lines E4 and E5 and in alignment respectively with the transverse score lines E3.

When the blank B has been formed, it is folded along the score lines E3—E3 and E4—E5 to form a box. In a preferred procedure, the opposite ends E1 and E2 are brought together by folding the blank on the center transverse score line E3 whereupon the meeting ends are suitably connected, as for instance by a length of adhesive tape. Thereafter the blank is opened up to form a hollow rectangle with additional folding on the other transverse score lines E3, then the top and bottom end flaps F1—F1 and F6—F6 are bent inwardly on the longitudinal score lines E4 and E5, and finally the top and bottom side flaps F2—F2 and F7—F7 are bent inwardly on the longitudinal score lines E4 and E5 and over the end flaps to complete the box.

For convenience of description, the longitudinal dimension of the side walls W2—W2 will be designated as the "length"; the transverse dimension of the side walls W2—W2 and of the end walls W1—W1 will be designated as the "depth"; and the longitudinal dimension of the end walls W1—W1 will be designated as the "width." As shown, the widths of the top and bottom end flaps F1—F1 and F6—F6 and of the top and bottom side flaps F2—F2 and F7—F7 are slightly less than the longitudinal dimension of the end walls W1—W2, the latter dimension being the true box width. In any event the transverse dimensions of the flaps are no greater than the box width.

When the blank is folded as above-described, it is highly preferable for the edges of the flaps F2—F2 and F7—F7 to abut each other in the completed box, so that they may be conveniently connected with each other, as for instance by an adhesive tape. In order that the said flaps may so abut, it is necessary for the transverse dimensions of the said flaps to be equal to one-half of the longitudinal dimensions of the end walls W1—W1, that is, equal to one-half of the width of the box. The transverse dimensions of the flaps F1—F1 and F6—F6 are always the same as those of the flaps F2—F2 and F7—F7, but these dimensions are less critical.

The blank dimensions may be widely varied to correspondingly vary the length, depth and width of the box. The box length may be changed to any extent within the capacity of the machine by changing the longitudinal dimension, or "length," of the blank side walls W2—W2, provided always that this last said dimension cannot be less than the longitudinal dimension of the blank end walls W1—W1. The box depth may be changed by changing the transverse dimensions, or "depth," of the blank side and end walls W2—W2 and W1—W1, without any corresponding changes in the flaps. The box width may be changed by changing the longitudinal dimension, or "width," of the blank end walls W1—W1, but when this is done the transverse dimensions of the flaps must be correspondingly changed so that the said transverse dimensions are equal to one-half of the changed longitudinal dimension, or "width," of the end walls.

GENERAL ORGANIZATION OF MACHINE

The machine embodying the present invention is adapted for scoring and slotting the described blanks B, and it is preferably also adapted for cutting the blanks from larger strips or sheets of paper board stock. When the blanks are to be formed from a sheet having a longitudinal dimension greater than that of the blank, means is provided for transversely cutting the blanks from the larger sheet to provide blanks having the required longitudinal dimension. By longitudinal movement of the larger sheet several blanks may be cut in the lengthwise direction from one sheet. When the blanks are to be formed from a sheet having a transverse dimension greater than that of the blank, a device is provided for longitudinally cutting or slitting the blank from the larger sheet to provide blanks having the required transverse dimension. In some instances the portion of the larger sheet that remains after longitudinal cutting may be wide enough to permit two or more blanks to be cut in the widthwise direction from one sheet. In other instances, the cutter merely serves as a trimming device, the remaining portion of the larger sheet not being wide enough for other blanks. In the following detailed description it will be assumed that the blanks B are to be cut from larger sheets or strips, but it will be understood that the invention, as to some of its aspects, is not so limited.

The machine for forming blanks B is illustrated as comprising generally a support such as a work table 10 (Figs. 2, 6, 7 and 10) which forms a pathway upon which sheet material in the form of a strip of paper board may be placed for longitudinal movement with respect to a number of instrumentalities which will operate thereon in a manner to cut the blank B to size and form the aforementioned slots and score lines. The said instrumentalities comprise trimming means 12 including a saw 104 (Figs. 2, 7 and 9) for trimming one edge of the strip or sheet or for dividing it longitudinally; feeding means such as a pair of upper and lower cooperating feed rolls 14 and 16 (Fig. 7) for feeding the strip longitudinally; blank forming means such as slotting and scoring devices 18, 18a and 20 (Figs. 7, 8, and 8a) for forming the slots N1—N1 and N2—N2 and the score lines E3—E3 extending transversely of the blank; pairs of cooperating upper and lower scoring rolls 22, 24 and 22a, 24a (Figs. 3, 4 and 7) for forming the score lines E4 and E5 extending longitudinally of the strip; cut-off means 25 such as a transverse knife 320 (Figs. 2 and 7) for cutting the blank to the proper length; and kick-off means 26 (Figs. 5 and 10) for moving the completed blank along a delivery apron to a place where it may be conveniently stacked flat together with other blanks or immediately folded to form a box as heretofore described. Provision is made for automatically interrupting the action of the feeding means, during the operation of the blank forming means and of the cut-off means. The foregoing instrumentalities are mounted in cooperating relation with each other on a frame F (Figs. 2, 6 and 7) which also serves to support an operating and controlling mechanism. The said operating and controlling mechanism includes electric and hydraulic means, which will be described in detail. The several instrumentalities may be varied as to the relationship among them and certain of them may be omitted when the corresponding functions are not required.

The frame F (Fig. 2) is comprised of a pair of substantially rectangular, spaced, box-like leg members 28 connected to each other near their upper ends by a pair of horizontal cross bars 30, and near their lower ends by a crossweb 32, the latter being wide enough to afford a shelf-like surface upon which is secured a large part of the driving mechanism. The leg members 28 and cross bars 30 are preferably castings connected by bolts 31, 31 and 33, 33 as in Fig. 6 although other suitable means such as welding may be employed. As shown in Figs. 2, 2a, 6 and 7, the table 10 rests on and is fastened to the top of the leg members 28 so as to occupy a substantially horizontal position. Rising from the top of the right leg member 28, as seen in Figs. 2, 2a, 3 and 4, and extending transversely therefrom across to the other leg, is a gooseneck type frame consisting of a pair of castings 34, 34' having substantially vertical portions 36 and substantially horizontal portions 38, these members being spaced as shown in Figs. 6 and 7 and affording a support for such of the aforesaid instrumentalities that operate on the top of the blank B.

Instead of using the gooseneck type of frame described above, a box frame may be employed such as shown in Fig. 17, which is an incomplete rear view otherwise similar to Fig. 2a. The said box frame comprises a pair of separated vertical spacers 36' replacing the vertical portions 36 of the gooseneck, each of which is fastened at its lower ends to the upper ends of one of the leg members 28, a pair of horizontal beams 38' replacing the horizontal portions 38 of the gooseneck fastened at one end to the upper ends of the spacers 36' and a second pair of vertical spacers 40 fastened to brackets 42 fixed to the opposite legs and supporting the opposite ends of the beams 38'. This type of frame has the advantages of being somewhat less expensive to construct and somewhat more rigid than the gooseneck type of frame described heretofore.

Suitable normally moving feeding devices are provided above and below the before-mentioned pathway of the machine for engaging the sheet to feed it longitudinally along the said pathway. The feeding devices are so positioned and so held that they remain in engagement with the sheet while the sheet is between them.

Preferably and as shown, the feeding devices comprise two longitudinally spaced sets of feed rolls, the rolls of one set being the before-mentioned upper roll 14 and the lower roll 16 and the rolls of the other set being the before-mentioned upper rolls 22, 22a and lower rolls 24, 24a. The feed rolls of both sets have their axes in normally fixed positions so that they remain in engagement with the sheet while the sheet is between them. The rolls of both sets are preferably spaced in the leading direction from the cut-off means 25, and the rolls of the respective sets are preferably spaced in opposite directions from the slotting and scoring devices 18, 18a and 20. The feed rolls of one set are adapted not only to effect feeding but also to effect longitudinal scoring of the blank and the rolls of the last said set comprise at least two pairs of rolls formed and transversely spaced to effect the said longitudinal scoring. As shown, the last said set of feed rolls adapted for also effecting scoring is spaced in the leading direction from the slotting and scoring devices but the invention is not necessarily so limited.

*Feeding mechanism*

Referring more particularly to the feed rolls 14 and 16 (Fig. 7), the lower feed roll 16 is mounted to turn on a substantially horizontal axis extending transversely of the machine. The ends of the roll are journaled in bearing blocks such as 44 (Fig. 11) fastened to the upper ends of the leg members 28. The said lower roll 16 has extending throughout the effective portion of its length a packet or cover 46 comprised of some rubber-like material which will have a tractive effect on the work as it is moving between the rolls to prevent slipping and to afford an assured feed. Rubber, cork or fabric may be employed to advantage. Fastened to one end of the lower roll 16 is a sprocket 48 over which passes a chain 50 (Fig. 21) by which the said feed roll is driven, as will appear hereinafter.

Similarly the upper feed roll 14 is provided with a sprocket 66 over which passes a chain 68 by which the upper feed roll is driven. The upper feed roll 14 (Fig. 2) has spaced along its length a plurality of short jackets of covering material 52, this material also being of a kind which will afford a tractive effect on the paper board. The feed roll 14 is suspended in a horizontal position for rotation and cooperation with the lower feed roll 16 in a pair of spaced hangers 54, 54 arranged near its opposite ends, these hangers in turn being pivotally supported on an eccentric shaft 56, shown in Figs. 2 and 7. The said eccentric shaft is supported at its ends in bracket members 58 fixed to the forward side of a transversely extending beam 160. The eccentric shaft 56 has an eccentric 60 thereon near each end in a position to be embraced by the respective hangers 54 so that rotation of the shaft 56 will effect vertical movement of the upper feed roll 14 to and from the lower feed roll 16. This vertical movement is provided to take care of different thicknesses of paper board to be fed between the rolls and hence to eliminate binding and scrubbing the sheet. Rotation of the eccentric shaft 56 is effected by an arm 62 fastened to one end thereof and extending vertically upward therefrom, as shown in Fig. 6, at the upper end of the arm having connected thereto a forwardly extending link 64. By grasping the link 64 and manually pulling the arm 62 forwardly or pushing it rearwardly, the eccentric shaft 56 may be rotated to adjust the roll spacing to accommodate board stock of varying thicknesses.

As is best shown in Fig. 21, the rotation of the feed rolls 14 and 16 in a direction to draw the sheet of paper board into the machine is effected through the chains 50 and 68 which also pass respectively over sprockets 72 and 70. The sprocket 72 is fixed to one end of a shaft 78 and the sprocket 70 is fixed to one end of a shaft 76, these shafts being arranged transversely of the machine and parallel to each other. Rotation of the shafts 76 and 78 is effected by means of a series of gears (Fig. 21)

from a hydraulic motor 80 (Figs. 6, 9 and 22) which is supplied with a suitable liquid such as oil under pressure from a motor pump unit 100 (Figs. 2ª and 22) as will be described hereinafter. The hydraulic motor 80 has fastened to its shaft 82 a gear 84 with which meshes a gear 86. On one face of the gear 86 there is a smaller gear 88 formed integrally therewith and meshing with a gear 90 which is formed integrally with one face of the sprocket 72. Hence clockwise rotation of the gear 84, driven by the hydraulic motor, effects clockwise rotation of the sprocket 72 and this in turn effects clockwise rotation of the lower feed roll 16, as seen in Fig. 21. The rotation of the gear 90 is transmitted to a gear 98 formed integrally with the sprocket 70 by way of two idler gears 92 and 96, the first gear 92 of which meshes with the gear 90 and the second gear 96 of which meshes with the gear 98. Clockwise rotation of the gear 90 through the medium of the gears 92 and 96 effects anti-clockwise rotation of the sprocket 70 and this in turn effects anti-clockwise rotation of the upper feed roll 14.

As mentioned above, the hydraulic motor 80 is operated by means of a motor pump unit 100 which consists of an electric motor M (Figs. 2ª and 22) coupled to a pump P for circulating oil under pressure to the various operating parts of the machine, including the hydraulic motor 80 which drives the aforesaid gearing. Oil is drawn from a tank T by the motor pump unit 100 and passes through a high pressure relief valve V1 and a check valve Vc into an unloading valve V2 operated by an electric solenoid L5. When the solenoid L5 is not energized, the movable element of the valve V2 is in the position shown in Fig. 22 so that the discharge from the pump is directed back to the tank T through the drain conduits c1 and c2. With the valve V2 discharging back to the tank, the pump P must overcome only a head equivalent to the friction losses in the valves V1 and V2 and the associated conduits so that the losses and heating of the oil are greatly reduced during standby periods.

The solenoid L5 is energized by the closing of a normally open switch s1 of a control system described in greater detail hereinafter, the said switch s1 constituting a trip device. The switch s1 is mounted above the table 10 so that its roller arm 102 projects downwardly towards the top of the table near the feed rolls 14 and 16 at the trailing side thereof and in the path of the strip or sheet as it is pushed towards the rolls. In Fig. 22 the rolls 14 and 16 are viewed in the same direction as in Figs. 6 and 7. The inserting of a sheet of stock in the machine closes the switch s1 to complete a circuit connecting the solenoid L5 to the terminals a and c of a conventional power source (not shown) by means of a circuit including the terminal c, the switch s1, the conductors w8, w7 and w6, the solenoid L5, and the conductors w4 and w17 to the terminal a. Upon the energization of the solenoid L5, the movable element of the valve V2 is moved toward the right, thereby connecting the discharge of the pump P to a high pressure header c3. The concomitant shutting off of the conduit c1 results in the building up of a fluid pressure in the header c3 which is determined by the setting of the high pressure relief valve V1. A hydraulic accumulator A is connected in the header c3 to minimize pressure fluctuations in the header c3 during the operation of the various hydraulic motors as hereinafter described.

The closing of the switch s1 also energizes a solenoid L1 from the power source by means of a circuit including the switch s1, a conductor w9, an interlock switch s7 which is closed when the slotting and scoring means 18, 18ª and 20 is in its uppermost position, a conductor w11, the normally closed switches s1a, s1b, s1c and s1d whose function will be described in detail hereinafter, the conductors w12 and w13, the solenoid L1, and conductors w14, w16 and w17 to the terminal a. Upon energization of the solenoid L1 the movable element of the valve V3 is moved upwardly to open position so as to provide a connection, through a valve V5, from the discharge port of the motor 80 to discharge conduits c4 and c2 and to the tank T. The last said connection includes a normally open slow-down valve V4, the function of which will be later described. As the inlet to the motor 80 in connected directly to the high pressure header c3, the opening of the valve V3 results in the operation of the motor 80, thus rotating the feed rolls 14 and 16, and also the scoring rolls 22, 24 and 22ª, 24ª as hereinafter described. Closing of the valve V3 by the de-energization of the solenoid L1 and the downward movement of the movable valve element blocks the discharge of the pump 80, thereby locking the rotor so that the inertia of the connected rolls and gears cannot cause overtravel thereof. The speed of operation of the motor 80 may be controlled by the valve V5 which may have an adjustable orifice.

As hereinafter explained in greater detail, the valve V3, when operated as described, serves to start and then stop or interrupt the action of the motor 80 and the rotation of the feed rolls and thus serves to stop and start or interrupt the feeding of the sheet or blank. The term "interrupt" and its derivatives are herein sometimes used for convenience and brevity to mean the stopping and subsequent starting of the motor and of the feed rolls or to mean the stopping and subsequent starting of feeding.

To prevent de-energization of the solenoids L1 and L5 during the period from the time the end of a sheet releases the arm 102 of the switch s1 until the box making cycle is completed, a second normally open switch s2 is connected in parallel with the switch s1 and positioned in an opening in the table 10, the said switch s2 constituting a second trip device. The switch s2 is located at the leading side of the feeding rolls 14 and 16 and preferably at the leading side of the hereinafter described scoring and slotting means 18, 18ª and 20 and of the hereinafter described scoring rolls 22, 22ª and 24, 24ª. However, the switch s2 is spaced from the switch s1 by a distance less than the shortest overall length of the blanks to be made by the machine. The said switch s2 has an arm 103 which is depressed when the sheet or blank engages and overrides it, the said arm when depressed serving to close the switch and to maintain the described circuits for the solenoids L5 and L1 until the sheet or blank has completed its travel through the machine.

Trimming or slitting mechanism

When the strip or sheet of stock is wider than the blank B to be formed, it is necessary to trim off one longitudinal edge thereof to provide the proper width, or if the strip or sheet is wide enough to make several blanks widthwise thereof, it is necessary to split the sheet. This trimming or slitting operation is effected by the trimming means 12. The trimming means 12 comprises in one form the circular saw 104 (Figs. 2, 5, 7 and 9) fixed to one end of a short shaft 106 for rotation about a horizontal axis and in a plane perpendicular to the surface of the table 10 and hence to the work resting on the table. The saw is immediately adjacent the left edge of the table as viewed in Fig. 2. The saw is situated so that its cutting edge bites into the stock sheet at or about the same time that it is engaged by the feed rolls. As shown, the stock is engaged by the trimming cutter or saw slightly before it is engaged by the rolls, the saw being spaced in the trailing direction from said rolls and also from the slotting and scoring means. The shaft 106 is journaled in a horizontal sleeve bearing 108 rigidly fastened by spaced arms 110 to the casing of an electric motor 112. The motor 112 is in turn fastened by means of a bracket 114 (Fig. 2) to the underside of the outer end of the horizontal portion 38 of the gooseneck frame. A pulley 116 is secured to the opposite end of the shaft 106 where it projects from the bearing 108, and rotation thereof is effected by a belt 122 passed over this pulley and over a pulley 118 fixed to the shaft 120 of the motor 112. In operation of the machine the motor 112 is energized from a suitable source of electric power so that the saw 104 rotates continuously.

It will be observed that the trimming means 12, and particularly the saw 104 thereof, is located near the left side of the machine, as viewed in Fig. 2. The portion of the stock sheet which is to constitute the successive blanks B is located at the right of the longitudinal plane of the saw and the feed rolls and other instrumentalities for acting upon the blank are all at the right of the said plane. The portion of the stock sheet that is not to constitute the blanks being currently formed is located at the left of the said longitudinal plane of the saw. The said remaining portion of the stock sheet may be only a narrow trimming or it may be of sufficient width to permit it to be again passed through the machine to form another series of blanks. In any event the said remaining portion of the stock sheet is not supported by the table 10 and moves by gravity to a lower level, downward movement being limited by the left frame leg member 28 as will be evident from an inspection of Fig. 2.

When a frame of the gooseneck type is provided as shown in Fig. 2, the said remaining portion of the stock sheet at the left of the saw can have any desired width, not being subject to any width limitation by reason of the construction of the machine. The alternative frame construction, as shown in Fig. 17 and as previously described, is less expensive as stated, but it does not permit the said remaining portion of the strip to be of indefinite width.

While the foregoing trimmer means 12 is perfectly effective in cutting through the sheet material, it has one disadvantage in that it produces a considerable amount of dust which is of a siliceous character and hence may be harmful to operators. Accordingly, there may be substituted for the trimming means 12 described above, a pair of cooperating cutting members, such as shown somewhat schematically in Figs. 18 and 19. The upper cutting member is in the form of a disk 104' fixed to the shaft of the upper feed roll 14, and the lower cutting member is constituted by a pair of spaced disks 105 fixed to the shaft of the lower feed roll 16. The disks 105 are spaced apart just far enough to receive between them the lower portion of the disk 104' and hence to afford a cutting action which will shear a narrow ribbon from the sheet material as the sheet passes between the feed rolls without chopping the severed ribbon up into fine particles. When this form of cutting means is employed, a doctor blade 107 is arranged close to the right side of the cutting disks 105 at the delivery side thereof to engage the upper side of the severed blank to prevent upward movement thereof. A second doctor blade 109 is situated between the disks 105 at the delivery side for stripping the narrow ribbon from between the disks 105 to prevent it from rolling up and accumulating in such quantity as to interfere with the cutting action of the disks.

*Blank forming or transverse slotting and scoring mechanism*

Means is provided for acting upon or forming the blank between the leading and trailing edges thereof, this means being movable downwardly to engage the sheet or blank and upwardly to disengage it. The said means may be varied but preferably and as shown it includes slotting devices for forming the slots N1, N1 and N2, N2 and a scoring device for forming the transverse score lines E3, E3.

There is a combined slotting and scoring means which comprises two slotting devices 18 and 18ᵃ and a scoring device 20 (Figs. 3, 7, 8 and 8ᵃ), the said means being located rearwardly of or in the leading direction from the feed rolls 14 and 16. The said means functions to cut the transverse notches or slots N1, N1 and N2, N2 which extend from the longitudinal edges of the work inwardly toward each other and it also functions to form the transverse score lines E3, E3 running between the inner ends of the slots. The slotting and scoring means is mounted above the table 10 for operating upon the work as it moves rearwardly from the feed rolls 14 and 16, but feeding is interrupted as hereinafter explained, while the slotting and scoring means operate. To effect slotting and scoring, vertical movement is imparted to the aforesaid means, as will now be described. The slotting and scoring devices 18, 18ᵃ and 20 are carried by a pair of spaced blocks 124 (Figs. 3, 7 and 8), each of which is formed integrally with the lower end of a leg 126. The upper ends of the legs 126 abut against and are transversely slidable along the lower horizontal face of a transverse beam 134. The said legs are additionally guided for transverse movement by means of a transverse horizontal shaft 128, each leg having for this purpose a pierced boss surrounding the shaft. The ends of the shaft 128 are journaled in links 130 (Fig. 3). The links 130 are in turn journaled on pins 132 fixed to the opposite ends of the said transverse beam 134. Vertical movement is imparted to the beam 134 and hence to the slotting and scoring devices 18, 18ᵃ and 20 by a pair of links 136, 136 the lower ends of which receive the ends of the pins 132, and the upper ends of which are pivotally supported on eccentrics 156, 156 (Figs. 3 and 4) at the ends of a transverse horizontal shaft 138. When the shaft 138 is turned the beam 134 is moved downwardly or upwardly, the movement of the beam being transmitted to the shaft 128, to the legs and blocks 126 and 124 and to the slotting and scoring devices 18, 18ᵃ and 20. The legs 126 are guided for vertical movement toward and from the table by the transverse beam 160, the said legs fitting a longitudinal opening which extends through the said beam from top to bottom. The means for turning the shaft 138 and the means for moving the legs and blocks transversely will be later described.

Each block 124 (Fig. 8) has fastened to its lower surface and extending longitudinally thereof a pair of angle bars 144 with the leg portions 145 extending downwardly therefrom and in spaced relation to each other. On the exposed surface of each leg portion 145 there is formed a channel 142 for the reception of cutting blades 146 which have saw-tooth cutting edges 147. When the knives 146, 146 of the two slotting devices 18 and 18ᵃ are moved downwardly, they pass into transverse slots in the table 10. In so moving they cooperate with normally fixed transverse supporting bars 153, 153 (Figs. 7, 11 and 12) so as to effect the required cutting or slotting action. The cutting blades 146 may be attached to the angle bars 144 in a detachable manner, for example by screws (not shown) so that the blades may be removed for sharpening. It is also possible, if desired, to make the angle bars 144 and associated blades 146 in the form of unitary members. As is shown in Fig. 8ᵃ, the end of each slot N is formed by a knife 140 secured to the ends of the bars 144 by the screws 141.

In the lower face of each block 124 beneath the angles 144 is a groove 148 in which there is seated a scoring bar 150 which has a T-shaped cross-section. This scoring bar is the essential element of the scoring device 20. The head 152 of the bar is seated in the slot 148 and is held therein by the angle bars 144 so that the bar 150 projects downwardly between the legs 145 to a point which is in the plane of the lower edges thereof and is substantially at the base of the tooth portion 147 of the cutters. This edge designated as 154 is blunt so as not to cut through the work. The scoring bar 150 is carried by the blocks 124 and extends entirely across the machine. Transverse movement of the bar 150 is prevented by a pin 151 (Figs. 11 and 12) which slidingly engages a slot in the bar head 152. However, the blocks 124 with their attached knives 146, 146 and 140 constituting the two slotting devices 18 and 18ᵃ are transversely movable by sliding along the scoring bar 150. The slotting devices 18 and 18ᵃ may be transversely moved in unison or otherwise by mechanism to be described. The effective length of the scoring bar 150 is always that portion thereof between the slotting devices.

As has been stated, vertical movement of the slotting and scoring devices 18, 18ᵃ and 20 is effected by eccentrics 156 (Figs. 3 and 4) at the ends of the eccentric shaft 138. The shaft 138 is turned by a pair of hydraulic motors 158 (Figs. 3, 4, 9 and 22), these being respectively connected to the eccentric shaft near the ends thereof and operated as will be described hereinafter. Each hydraulic motor 158 is in the form of a piston and cylinder assembly fastened between the spaced horizontal portions 38 of the gooseneck frame. Each motor translates the reciprocal motion of its piston into rotary movement of the shaft 138 in a well-known manner by means of a rack and pinion drive enclosed within the motor housing.

Transverse adjustment of the slotting devices 18 and 18ᵃ is effected by slots or grooves in the respective blocks 124 which grooves engage tongues extending as at 159 (Fig. 9) from correlated transversely movable carriages 186 and 187. As best shown in Fig. 7, each of the said carriages is supported and guided by pairs of oppositely disposed rollers 188, 189 running in transverse channels 190, 190 suspended from brackets 192 secured to the horizontal portion of the gooseneck frame member 34.

As hereinafter explained in greater detail, the blank forming or slotting and scoring mechanism is operated in timed relation with the interruption of feeding, the said mechanism engaging the sheet or blank while the motor 80 and feed rolls 14 and 16 are idle. Inasmuch as the feed rolls remain in engagement with the sheet while roll rotation and feeding are interrupted, the said rolls assist in holding the blank in a fixed position during the operation of the slotting and scoring mechanism.

*Longitudinal scoring mechanism*

The upper feed rolls 22 and 22ᵃ and the cooperating lower feed rolls 24 and 24ᵃ (Fig. 4) constitute the second set of feed rolls and they are adapted not only for feeding but also for forming the longitudinal score lines E4 and E5 in the blank B, as heretofore pointed out. The said rolls are mounted for rotation on transverse shafts 76 and 78, these shafts being driven through the beforedescribed gearing shown in Fig. 21 by means of the gears 70 and 72, respectively. The drive for the feed rolls of the second set is so related to the drive for the feed rolls of the first set that all the said rolls have the same peripheral speed. The feed rolls of the first set feed the blank until it is engaged by the feed rolls of the second set, and then the blank is fed by the feed rolls of both sets. The feed rolls of the second set which are also scoring rolls serve to feed the blank after it has been cut off and has passed beyond the feed rolls 14 and 16 of the first set. The shaft 76 is journaled at its ends in the forward portions of arms 180, 180 (Figs. 3, 4 and 7). The shaft 78 is journaled at its ends in bearings 161, 161 fastened to the upper ends of the legs 28, 28. Each of the upper scoring rolls 22 and 22ᵃ is fixed to a hub 163, the latter being keyed to the shaft 76 but being free to move therealong and transversely of the machine. Carried by each hub 163 is a nonrotatable sleeve 182, the sleeve and the hub being so engaged that they are transversely movable in unison. Each sleeve 182 has a slot 162 which receives a tongue 184 on the corresponding carriage 186 or 187. Transverse adjustment of either carriage effects similar adjustment of the corresponding scoring rolls 22 or 22ᵃ. The lower scoring rolls 24 and 24ᵃ are in like manner fixed to hubs 167 keyed to the shaft 78 but free to move therealong transversely of the machine. Respectively connected with hubs 167 are nonrotatable carriages 164 and 165, the carriages and the hubs being so engaged that they are transversely movable in unison. Each of the carriages 164 and 165 is supported and guided by pairs of oppositely disposed rollers 166, 166 running in channels 168, 168 secured to the frame legs 28, 28 by means of bolts 172.

*Adjusting mechanism for transverse slotting devices and longitudinal scoring rolls*

The slotting devices 18 and 18ᵃ, the upper scoring rolls 22 and 22ᵃ and the lower scoring rolls 24 and 24ᵃ are transversely adjustable to change the width and depth dimensions of the box blank B. The mechanism for effecting the required adjustments is shown in Figs. 4, 6 and 10 and in the schematic Fig. 23. It will be understood that, as viewed in Fig 23, the saw 104 is at the right although not shown.

Power for operating the adjusting mechanism is supplied from two reversible electric motors 258 and 260 (Fig. 10) on a platform 262 extending between the horizontal portions of 38 of the goosenecks 34 and 34'. The operation of the motors 258 and 260 is controlled by means of conventional push button stations (not shown).

The motor 258 (Figs. 10 and 23) adjusts the upper carriage 187 and the lower carriage 165 with respect to the trimming saw 104 (Fig. 1) and it also effects other adjustments as will be explained. By means of a V belt 254 a pulley 256 on the motor shaft is connected with a pulley 250 on a shaft 264. As is best shown in Fig. 10, the ends of the shaft 264 are journaled in bearing brackets 242 and 273. A bevel gear 266 is carried on the shaft 264 adjacent the bracket 273, this gear meshing with a similar bevel gear 268 on a transverse shaft 270. The said shaft operates an indexing means as hereinafter described.

A helical gear 246 is fastened to the opposite end of the shaft 264 adjacent the bracket 242. Also journaled in the bracket 242 is a shaft 238 carrying a helical gear 245 (Fig. 23) which is driven by the gear 246. The opposite end of the shaft 238 is journaled in an arm 211' of a bearing bracket 211 (Figs. 4 and 6). The end of the shaft 238 extending beyond the bracket arm 211' is coupled by bevel gears 234 and 229 to a vertical shaft 209 (Fig. 4) which is journaled in a second arm 211" of the bracket 211 and in brackets 216 and 214.

Mounted on the shaft 209 between the brackets 211 and 216 is a bevel gear 226 which meshes with a similar gear 222 on the end of a lead screw 196. The end of the lead screw 196 is journaled in an arm 218 extending from the bracket 216 so that the screw extends transversely of the machine (Fig. 23) with an unthreaded portion projecting through an aperture in the upper carriage 186 thus permitting a threaded portion thereof to engage a threaded aperture in the other upper carriage 187.

A second bevel gear 208 is mounted upon the shaft 209 below the bracket 214, the said gear being positioned to mesh with a similar gear 204 upon the unthreaded end of a second lead screw 176. The unthreaded end of the lead screw 176 is journaled in a bearing bracket 200 mounted upon the top of the frame leg 28 with an unthreaded portion extending through apertures in a guide carriage 564, whose function is described in detail hereinafter, and in the lower carriage 164 so that a threaded portion of the lead screw can engage a threaded aperture in the other lower carriage 165.

From the above it will be apparent that operation of the motor 258 will concomitantly rotate the lead screws 196 and 176 so that the carriages 187 and 165 are moved toward or from the trimming saw 104. The upper scoring roll 22ᵃ and the slotting device 18ᵃ associated with the carriage 187 and the lower scoring roll 24ᵃ associated with the carriage 165 are also moved toward or from the saw 104. This changes the length of the slots N2—N2 (Fig. 1) and changes distance of the left score line E5 from the left edge of the blank B. The length of the slots N2—N2 and the distance of the score line E5 from the left edge of the blank are equal to half the width of the box to be formed therefrom so that the oppositely disposed flaps F2, F2 and F7, F7 will abut to form the top and bottom of the box.

The motor 260 (Figs. 10 and 23) adjusts the upper carriage 186 and the lower carriage 164 with respect to carriages 187 and 165 and also effects other adjustments as will be explained. By means of a V belt 257 a pulley 255 on the motor shaft is connected with a pulley 253 on a shaft 280 journaled in bearing brackets 244 and 287. As best shown in Fig. 10, the ends of the shaft 280 are journaled in bearing brackets 244 and 287. A bevel gear 282 is carried on the shaft 280 adjacent the bracket 287, this gear meshing with a similar bevel gear 282 on a transverse shaft 286. The said shaft operates an indexing means as hereinafter described.

A helical gear 248 is fastened to the opposite end of the shaft 280 adjacent the bracket 244. Also journaled in the bracket 244 is a shaft 236 carrying a helical gear 244 (Fig. 23) which is driven by the gear 248. The opposite end of the shaft 236 extending beyond the bracket 211 is coupled by bevel gears 232 and 228 to a vertical shaft 210 which is also journaled in the bearing brackets 211, 216 and 214.

Fastened on the shaft 210 between the brackets 211 and 216 is a bevel gear 224 meshing with a similar gear 220 upon the end of a shaft 194 which is journaled in an arm of the bracket 216. The shaft 194 extends through apertures in the lower portions of the carriages 186 and 187 with its end portion projecting through an aperture in a Z-bracket 199 upon the side of the carriage 187. Mounted upon the shaft 194 between the Z-bracket and the end of the carriage 187 is a gear 197. Relative rotational movement between the gear 197 and the shaft 194 is prevented by a key (not shown) engaging a keyway in the shaft which is extended to permit the gear to move axially with respect to the shaft. A meshing gear 198 is secured by means of a set-screw (not shown) upon the unthreaded end of a lead screw 195 which projects through an aperture in the carriage 187. Relative axial movement between the lead screw 195 and the carriage 187 is prevented by two thrust collars 193 which are secured to the screw adjacent the outer sides of the carriage 187 and the bracket 199 respectively. The opposite threaded end of the lead screw 195 engages a threaded aperture in the carriage 186.

Carried on the end of the shaft 210 extending below the bracket 216 is a bevel gear 206 which meshes with a similar gear 202 upon the end of a shaft 174. The shaft 174 extends through apertures in the lower portions of the carriages 164 and 165, being journaled at its respective ends in the bracket 200 (Fig. 4) and a Z-bracket 179 (Fig. 23) fastened to the side of the carriage 165. Mounted between the Z-bracket 179 and the carriage 165 are two meshing gears 177 and 178 which are secured respectively to the shaft 174 and to an unthreaded portion of a lead screw 175 in a manner similar to that in which gears 197 and 198 are secured as was described in detail heretofore. A threaded portion of the lead screw 175 engages a threaded aperture in the carriage 164.

It will be apparent from the above that the operation of the motor 260 simultaneously rotates the shafts 174 and 194. The rotation of the shaft 194 drives the lead screws 195 through the gears 197 and 198 so that the carriage 186 and its associated upper scoring roll 22 and slotting device 18 are moved relatively to the carriage 187. The said carriage 187 is maintained by means of the lead screw 196 in the position selected as described heretofore. The simultaneous rotation of the shaft 174 similarly moves the carriage 164 and the associated lower scoring roll 24 with respect to the carriage 165 by rotating the lead screw 175 by means of the gears 177 and 178. The said carriage 165 is maintained by means of the lead screw 176 in the position selected as before described. It will be evident that the distance between the carriages, adjustable as described above, determines the distance between the pairs of upper and lower scoring rolls 22, 24 and 22ª, 24ª and between the inner ends of the slotting devices 18, 18ª. This distance represents the depth of the completed box.

Edge guides and adjusting mechanism therefor

In order to guide the strip or sheet of paper board and to insure the cutting thereof to a given overall width, there are provided forward and rearward edge guides 350 and 352 (Figs. 11 and 12) at the right side of the machine. The said guides are movable toward and from the trimming saw 104 so as to adjust the distance therebetween. The guides are so spaced longitudinally that they do not interfere with the slotting and scoring means 18 or the cutting-off knife 320. The said guides 350 and 352 constitute two guide portions spaced respectively in the leading and trailing directions from the said slotting and scoring means. It has been pointed out that the trimming cutter or saw 104 is spaced in the trailing direction from the feed rolls and from the slotting and scoring means and said cutter or saw is therefore opposite the last said or trailing guide portion 352.

The described relationship of the edge guide portions and of the feed rolls and of the slotting and scoring means and of the trimming cutter or saw is important. The saw is spaced in the trailing direction so that it trims the sheet to the required width before it is acted upon either by the feed rolls or by any of the sheet forming instrumentalities such as the slotting and scoring means. Said instrumentalities during operation tend to slightly change the sheet dimensions and, if the cutter were located otherwise than as described, there would be an unsevered sheet portion attached at one side, that is, at the side opposite the guide portion that would interfere with these dimensional changes. The trailing guide portion 352 opposite the cutter insures trimming to the required width and the leading guide portion 350 cooperates with the trailing portion 352 to guide the sheet in a straight path through the machine.

The leading guide 350 has a vertical wall 524 and a horizontal wall 525, the latter resting flat on the table 10. A plate 532 is fastened to the inner or left side of the vertical wall 524 just above the horizontal wall 525 and spaced therefrom by a distance substantially equal to the thickness of the paper board, thereby forming a guideway 530 in which the longitudinal edge of the paper board may slide. The entrance to the groove 530 is flared at 534. The trailing guide is made in a corresponding manner by an angle having a vertical wall 524' and a horizontal wall 525' resting flat on the table 10. The top of the groove 530' in this case is formed by a pair of spaced plates 532' fastened to the vertical wall at opposite ends, the forward one of which is flared at 534'.

In the table 10 there are formed transversely extending spaced parallel slots 536 and 536'. Projecting upwardly through the slots 536 and 536' are posts 528, 528, having at their upper ends horizontal portions 537 connected to the side walls 524 and 524' of the respective guides. A bar 538 connects each pair of upwardly projecting posts of the respective front and rear guides to strengthen the structure generally. The lower ends of the posts are all fastened to a horizontal bar 540 which passes through and is fixed for support in a sleeve 542 (see also Fig. 23) formed integrally with a carriage 564. The said carriage has on its opposite side pairs of rollers 566, 566 which are entered in the aforesaid channels 168 and which guide the carriage for transverse movement. To steady the structure as a whole a pair of rollers 546 (see also Fig. 4) are provided for contact with the outer sides of the channels 168, the said rollers being supported by arms 544 fastened to the bar 540.

Transverse movement of the carriage 564 is effected by a lead screw 569 (Fig. 23) which engages a threaded aperture in the carriage 164. The lead screw 569 is rotated by means of a gear 568 which meshes with a gear 565. A shaft 173 extends through the aperture in the gear 565, relative rotational movement between the gear and the shaft being prevented by a key (not shown) which engages a keyway in the shaft whose length is sufficiently great so as not to interfere with transverse movement of the gear when the carriage 564 is moved. The shaft 173 is journaled in apertures in the carriages 164 and 165. The other end of the shaft 173 is journaled in the bearing bracket 200 (Fig. 4). A gear 563 is secured to the shaft 173 and this meshes with a gear 561 (Fig. 24) fastened to the end of the lead screw 176. As the lead screw 176 is rotated by the motor 258 to move the carriages 165 to adjust the distance between the saw 104 and the scoring rolls 22ª and 24ª and the inner end of the slotting device 18ª, the lead screw 569 is rotated on the same rate by the shaft and gears described above. The threads on the screws 196, 176 and 569 have the same lead so that the distance that the carriage 564 is moved relatively to the carriage 164 is equal to the distance that the carriages 187 and 165 are moved with respect to the saw 104. The described action serves to position the guides 350 and 352 at a distance from the scoring rolls 22 and 24 and from the inner end of the slotting device 18 which is equal to the distance from the saw 104 of the scoring rolls 22ª and 24ª and of the inner end of the slotting device 18ª.

*Summary of operation of mechanism for adjusting transverse slotting devices, longitudinal scoring rolls and edge guides*

From the foregoing description and by reference to Figs. 3, 9 and 23, it will be apparent that, by operation of the motor 258, the carriages 186, 164, 187 and 165 may be moved in unison with respect to a fixed longitudinal plane at one side which plane is preferably that of the saw 104, this adjustment serving to change the width dimensions of the blank so far as the flaps are concerned. During such movement, the carriage 564 and the edge guides 350 and 352 are moved to an equal extent with respect to the carriages 186, 164, 187 and 165, that is, the extent of movement of the carriage 564 and of the edge guides is twice the extent of movement of the said carriages 186, 164, 187 and 165. It will be apparent that, for any selected box depth, it is possible, by a single adjustment to set the machine to cut and score a sheet with the score lines E4 and E5 and the slots N1, N1 and N2, N2 as shown in Fig. 1 all properly positioned for a box blank having flaps of any selected width dimensions.

It will also be apparent that, by operation of the motor 260, the carriages 186 and 164 may be adjusted to change the depth dimension of the blank B, that is, to change the transverse dimensions of the walls W1—W1 and W2—W2. During such adjustment, the carriages 187 and 165 remain in their previously established relationship with the saw 104 and the carriage 564 for the edge guide remains in its previously established relationship with the other carriages. It is thus possible by another single adjustment to set the machine with the score lines E4 and E5 and the slots N1, N1 and N2, N2 properly positioned for a box of any selected depth.

Referring particularly to Fig. 3, it will be observed that the slotting device 18ª is positioned with its left end flush with the edge of the table 10 and therefore in the longitudinal plane of the saw 104. The said slotting device is therefore positioned to cut slots N2, N2 of maximum length. The edge guides (not shown in Fig. 3) are correspondingly positioned with their guiding portions in the same longitudinal plane as the right end of the slotting device 18. This slotting device is therefore also positioned to cut slots N1, N1 of maximum length. When the blanks are to be formed for a box having a smaller width, the two slotting devices 18 and 18ª are adjusted in unison toward the left and the edge guides are adjusted toward the left and to the same extent with respect to the slotting device 18. The adjustment of the slotting device 18ª toward the left causes it to project beyond the edge of the table 10 and beyond the plane of the saw 104. However, the projecting portion of the slotting device 18ª does not cut the remaining portion of the stock at the left of the saw, as the said remaining portion is not at the level of the table 10. As previously stated, the said remaining portion has moved downwardly by gravity, being supported at a lower level by the left frame leg member 28.

The relative positions of the pairs of left and right scoring rolls 22, 24 and 22ª and 24ª and of the associated slotting devices 18, 18ª are indicated by means of "width" and "depth" scales 278 and 292 (Fig. 5), preferably calibrated directly in box dimensions, mounted on the rear of the horizontal portion 38 of the gooseneck 34. A pointer 276 for the "width" scale 278 is carried upon a block 274 which is slidably supported in a horizontal channel member 275. The block 274 has an internally threaded aperture engaging a threaded portion of the shaft 270 which is journaled at one end in the bearing bracket 272, the other shaft end being journaled in the bearing bracket 273 (Fig. 10). Operation of the motor 258 to change the width dimensions rotates the shaft 270 thereby moving the pointer 276 along the scale 278 to directly indicate the width dimension.

A pointer 290 for the "depth" scale 292 is carried upon a block 288 which is slidably supported in a horizontal channel member 277. The block 288 has an internally threaded aperture engaging a threaded portion of the shaft 286 which coupled to the depth adjusting mechanism as described in detail heretofore. Operation of the motor 260 to change the depth dimension rotates the shaft 286, thereby moving the pointer 290 along the scale 292 to directly indicate the depth dimension.

*Miscellaneous details*

While the described means for indicating the dimensions of the box is sometimes preferable, it is also within the scope of the invention to use a somewhat simpler arrangement of scales and hence to eliminate some of the expensive gearing and shafting described above. Accordingly, as shown in Fig. 10ª, the scales and indexing means as described may be replaced as follows: There may be fixed to the sleeve 182 of the upper scoring roll 22ª a scale bar 292', the latter being arranged horizontally and having graduations thereon representing depth. On the sleeve 182 of the upper scoring roll 22 there is fastened a pointer 290' so that when one roll is moved relative to the other roll, the scale bar 292' will be moved relative to the pointer 290', thus directly indicating the distance between the scoring rolls at any given time and hence the depth of the box. Correspondingly a width scale 278' may be fixed to the gooseneck 34 and a pointer 276' may be attached to the carriage 187 so that movement of the scoring rolls bodily and in unison will be correctly measured on this scale and will indicate the width of the box.

It is necessary to provide for some movement of the upper and lower scoring rolls 22, 22ª and 24, 24ª substantially vertically relatively to each other for different thicknesses of work. Hence the shaft 76 upon which the upper scoring rolls are mounted is arranged to be moved substantially vertically with respect to the shaft 78, the latter being mounted in fixed bearings 161 (Fig. 4). To this end the arms 180, 180 which carry the shaft 76 are pivoted substantially midway of their ends on a shaft 296 (Fig. 7). The rear ends of the arms 180 surround eccentrics 299 on shaft 298 which extends transversely of the machine, the opposite ends of which are journaled in bearings 302 and 304 (Fig. 9). When the shaft 298 is rotated the arms 180 are tilted about the shaft 296 so as to raise or lower the shaft 76 and hence change the spacing between the scoring rolls. To effect rotation of the eccentric shaft 298 there is fastened to one end thereof, as shown in Fig. 5, a crank arm 306 having at its free end a spring-pressed pin 308 arranged to engage within one of a series of holes in an indexing plate 310 to hold the shaft 76 at a selected position.

If desired, there may be substituted for the foregoing mechanism the somewhat simpler adjusting mechanism shown in Fig. 20 wherein there is pivotally attached to a pin 298' at the rear end of each of the arms 180 a threaded bolt 306' which passes upwardly through a horizontal flange 307' of an angle member 308' extending transversely of the machine above the arms. The upwardly extended threaded portion of each bolt has on it an adjusting nut 309', rotation of which will raise or lower the arm 180. This latter adjustment of the opposite arms 180, independently of each other, permits adjustment of the shaft 76 not only vertically relative to the shaft 78 but also permits angular adjustment of the shafts in a vertical plane.

Cut-off mechanism

After the work has been operated upon by the transverse slotting and scoring means and by the longitudinal scoring means, it is cut off to the desired length by the cutting-off means 25 which is in the form of a long bladed knife 320 (Fig. 1) arranged transversely of the machine and pivotally supported in a bracket 322 attached to the right frame leg 28. The knife preferably has a saw-tooth edge 324 and it is moved into and out of an elevated normally retracted position to effect cutting of the material. When the knife is moved downwardly, it passes into a transverse slot in the table 10. In so moving it cooperates with a normally fixed transverse supporting bar 321 (Figs. 7, 11 and 12) so as to effect the required cutting-off action.

By reference particularly to Fig. 7, it will be observed that the knife 320 is located at the trailing side of all of the other instrumentalities operating upon the blank with the exception of the saw 104. As viewed in Fig. 7, the stock is moved from left to right and the saw 104 is so positioned that the stock is cut longitudinally by the saw before it is cut transversely by the knife. Thus, when the knife moves downwardly to effect transverse cutting, the blank is entirely severed from the remaining portion of the larger sheet and is free to be moved independently of the sheet by the scoring rolls and by the previously mentioned and hereinafter described kick-off means 26.

The knife 320 is operated by toggle means including a link 326 pivotally connected to the knife at 328, a link 330 pivotally connected to the forward gooseneck frame at 332, and a head 334 to which the links 326 and 330 are pivotally connected. The head 334 is fastened to one end of a piston rod 338 which forms part of a motor 342 comprising a piston and cylinder assembly pivotally supported at 344 in a bracket 346 fastened to the underside of the horizontal portion 38 of the gooseneck 34.

The operation of the motor or piston and cylinder assembly 342 is similar to that of the motor or piston and cylinder assemblies 158 for moving the slotting and scoring devices. The knife 320 is maintained in a retracted position when a solenoid L3 (Fig. 22) is de-energized so that the movable element of a valve V7 controlled thereby is in the position shown. In such position the valve V7 connects by means of a conduit c9 the end of the cylinder assembly with the high pressure header c3 whereby the piston is maintained in position to retract the knife 320. The valve V7 concomitantly bleeds the opposite end of the cylinder 342 to the tank T through a conduit c11 and the drain c8. Upon the energization of the solenoid L3, as described below, the movable element of the valve V7 moves upwardly to connect the conduit c11 to the high pressure header c3 and concomitantly connects the conduit c9 to drain c8 whereby the piston of the assembly 342 moves the knife 320, as described heretofore, to cut off the workpiece.

As hereinafter explained in greater detail, the cut-off mechanism is operated in timed relation with the interruption of feeding, the said mechanism engaging the sheet or blank while the motor 80 and the feed rolls 14 and 16 are idle. Inasmuch as the feed rolls remain in engagement with the sheet while roll rotation and feeding are interrupted, the said rolls assist in holding the blank in a fixed position during the operation of the cut-off mechanism.

Control mechanism for lengthwise dimensions

As hereinbefore pointed out, the movement of the feeding means, more particularly the rotation of the feed rolls, is interrupted so as to interrupt the feeding of the sheet while it is acted upon by the instrumentalities such as the slotting and scoring mechanism and the cut-off mechanism. The means for interrupting, or for arresting and restarting, the movement of the feeding means is dependent upon the feeding of the sheet by the said feeding means. More specifically the said movement interrupting means comprises a control mechanism which includes at least one element or device automatically actuated or controlled by the leading edge of the sheet upon movement thereof to a predetermined position. As to details, the said control mechanism may be widely varied within the scope of the invention. One suitable control mechanism is shown in the drawings and will be fully described.

At the rear portion of the machine (Figs. 9 and 10) and upon the same level as the bight of the upper and lower scoring rolls 22, 22ª and 24, 24ª which make the longitudinal score lines E4 and E5, there is an apron or table 548 which extends horizontally from the frame of the machine and has on it the kick-off mechanism 26 and also gauging means for controlling the distances that the blank will travel between the successive slotting and scoring operations and the cutoff operation, that is, the positions at which the slotting and scoring means and the cut-off knife descend to form a blank having side and end walls of given dimensions. This gauging means consists of four gauge assemblies 550, 552, 554 and 556 (Fig. 10) arranged near the left edge of the apron 548 for longitudinal adjustment therealong.

Extending rearwardly along the left portion of the table 548 are five equally spaced parallel bars 566 (Fig. 10) so that four ways 567 are provided for the four gauge assemblies 550, 552, 554 and 556. Since the gauge assemblies are identical, except for different scale plates carried thereby, only one assembly 556 will be described herein as representative of the construction and operation of all of them, this being shown in Figs. 13, 14, 15 and 16.

The gauge assembly 556 comprises a scale plate 557 which is fastened to the top of a channel-shaped member 558 (Fig. 15) having spaced walls 560 and a horizontal top wall 562. The channel member 558 is placed in the innermost way with the outer surfaces of its walls 560 fitting between the immediately adjacent pair of bars 566, 566. The channel member 558 is supported for longitudinal adjustment between the bars by pairs of wheels 549 fastened to the opposite walls of each channel and resting on the top edges of the bars. The forward end of the channel 558 and the scale plate 557 thereon is bent down at 570 (Fig. 13) to provide an inclined surface to catch the leading edge of the paper board and cause it to rise freely up onto the top of the scale plate. In order to lock the gauge assembly 556 at a given position there is provided through the plate 557 and the top wall 562, an opening 578 into which the upper portion of a knurled headed screw 582 projects without extending above the surface.' The screw 582 is threaded through one of the side walls 560 and a reinforcing plate 584 fastened thereto. Movement of the gauge assembly 556 is prevented by rotating the screw 582 so that it binds against the bar 566.

Within the channel member 558 there is a spring biased operating rod 574 connected at its rear end for the operation of an initially open switch s6 and connected at its forward end with a pivoted feeler or detector finger or control element F6 which extends upwardly through the scale plate 557 in position to be engaged by the rearwardly moving leading edge of the blank B. There is preferably a second spring biased operating rod 572 connected at its rear end for the operation of a second initially open switch s12 and connected at its forward end with a pivoted feeler finger or control element F12 similar to the control element F6 but spaced therefrom toward the front. The control element F12 is positioned to be first engaged by the leading edge of the blank and it closes the switch s12 to slow down the feed rolls as hereinafter explained. The control element F6 is subsequently engaged by the leading edge of the blank and it closes the switch S6 to stop the motion of the feed roll and to effect other results as hereinafter explained. Each control element is movable far enough to permit the advancing blank to move over it, the corresponding switch remaining closed.

Each gauge assembly has connected thereto at 598 a nonelectrical cable 586 which passes over a grooved roller 596 located in a fixed position, doubles back on itself, passes over a grooved roller 592 mounted at one end of a yoke 594, doubles back on itself again and is connected at 588 to a pin 590 set into one of the bars 566. Each gauge assembly also has connected thereto at 602 an electrical cable 600 which passes over a grooved roller 603 located in a fixed position, doubles back on itself, passes over a grooved roller 604 mounted at the other end of the yoke 594, doubles back on itself again and extends to a fixed point of connection (not shown). The cable 600 has conductors connected with the switches s12 and s6 and it provides electric connection to the control system shown in Fig. 22. With this arrangement, each gauge assembly may be readily adjusted along the ways, the cable 586 cooperating with the cable 600 to enable the effective length of the latter to vary without objectionable sagging or looping.

As illustrated in Fig. 10, the gauge assembly 550 is located so that the second control element F3 thereof is at a distance from the slotting and scoring means equal to the length of an end wall (W1) of the blank which is the "width"; the second gauge assembly 552 is located so that the second control element F4 thereof is at a longitudinal distance from the said control element F3 equal to the length of the next adjacent side wall (W2) of the blank which is the "length"; the third gauge assembly 554 is located so that the second control element F5 thereof is at a longitudinal distance from the said control element F4 equal to the length of the next adjacent end wall (W1) of the blank which is again the "width"; and the fourth gauge assembly 556 is located so that the second control element F6 thereof is at a longitudinal distance from the control element F5 equal to the length of the next adjacent side wall (W2) which is again the "length." The "length" dimensions cannot be shorter than the "width" dimensions, but for a square box they may be equal thereto.

The four control elements F3, F4, F5 and F6 when engaged by the leading edge of the blank successively operate their respective switches s3, s4, s5, and s6 (Fig. 22) to stop the operation of the feed rolls and the scoring rolls and to cause the operation of the slotting and scoring means 18, 18ª and 20 and of the cut-off knife 320. The associated control elements F9, F10, F11 and F12 are respectively spaced toward the front from the control elements F3, F4, F5 and F6. When the said control elements F9, F10, F11 and F12 are engaged by the leading edge of the stock they successively operate their respective switches s9, s10, s11 and s12 (Fig. 22) to retard or slow down the operation of the feed rolls and the scoring rolls prior to the stopping thereof by the action of the control elements F3, F4, F5 and F6.

Preferably and as shown in Figs. 2, 5, 9 and 10, a longitudinal guide 576 is provided at the side of the table 548 adjacent the gauging assembly 552. This guide serves to prevent the leading portion of the blank from curling upwardly so that it would not properly engage the several control elements.

The scale plates on the several gauge assemblies are preferably graduated in inches corresponding to the required width and length dimensions of the blank to be formed. While the distance between the slotting and scoring means and the first control element F3 is designated as "width," and the distance between the first control element F3 and the second control element F4 is designated as "length," and the distance between the second control element F4 and the third control element F5 is designated as "width," and the distance between the third control element F5 and the fourth control element F6 is designated as "length," it will be understood that this sequence may be reversed without affecting the operation of the machine. The "width" settings of the two gauge assemblies therefor, as shown by the corresponding scales, must be the same as the "width" setting for the slotting devices, scoring rolls and edge guides as shown by the scale 278 (Fig. 5).

*Control system*

The pairs of control elements on the several gauge assemblies control the operation of the slotting and scoring devices and of the cut-off knife 320 as follows. When the blank has been fed through the machine by the feed rollers to close the switch s9 by means of the control element F9, the slow-down solenoid L4 (Fig. 22) is energized from the power source by means of a circuit including the terminal c, the conductors w1, w2, the solenoid L4, the conductors w18 and w19, the switch s9, the time opening switch st1 whose function is described below, and the conductor w17 to terminal a.

The connections and functions of the valve V3 have been previously described, the said valve being normally held in its open position by the solenoid L1. The valve V4 has been designated a slow-down valve, the movable element of this valve being normally positioned as shown in Fig. 22. Upon the energization of the solenoid L4 by the closing of the switch s9, the movable element of the valve V4 is moved upwardly to re-direct the liquid discharged from the motor 80 through the conduit c12 wherein is located a restricting orifice, preferably an adjustable valve such as V8. The restriction so imposed in the motor discharge line by the valve V8 increases the back pressure on the motor 80 so that the rotational speed of the motor and of the connected feed rolls and scoring rolls is reduced, the result being that the blank is moved slowly until its leading edge engages the second control element F3 on the gauge assembly 550.

The control element F3 closes the switch s3 upon engagement thereof by the leading edge of the blank. The closing of the switch s3 simultaneously completes two circuits, one of which energizes a solenoid La of a relay Ra, and the other of which energizes a time delay relay which is schematically shown as a solenoid Lt1. It will be understood that any type conventional time delay relay may be used, for example, such as one depending upon the discharge of a capacitor to furnish the time delay. Upon energization, the solenoid Lt1 opens the normally closed switches st1 and st11, but the said switches are opened after a predetermined short period of time. The circuit energizing the solenoid Lt1 from the power source comprises the terminal c, the conductors w1, w3 and w21, the switch s3, the solenoid Lt1 and the conductor w17 to the terminal a. The said switches st1 and st2 remain open until the blank has been completed, the reason being that the switch s3 remains closed with resultant continued energization of the solenoid Lt1.

The circuit energizing the relay solenoid La from the power source includes the terminal c, the conductors w1, w3 and w21, the switch s3, the solenoid La, the two time opening switches st1 and st11 and the conductor w17 to the terminal a. The energization of the solenoid La opens the switch s1a to deenergize the solenoid L1 so as to close the valve V3 and thus stop the motor 80 and the feed rolls as previously described. It will be understood that the speed of the motor and of the feed rolls and scoring rolls has been previously reduced by the closing of the switch s9 and the resultant operation of the valve V4.

The solenoid Ra not only opens the switch s1a, but it also simultaneously closes a normally open switch s2a and energizes a solenoid L2 from the power source by a circuit including the terminal c, the conductors w1 and w3, the switch s2a, the solenoid L2, and the conductor w17 to the terminal a.

The solenoid L2 is connected with the movable element of a valve V6 which controls the before-mentioned hydraulic motors 158, 158. The said valve element is normally in the position shown, and a hydraulic connection is provided through the valve and through the conduit c6 to the lower ends of the cylinders of the motors 158, 158. Thus the pistons of the motors are held in their upper positions to hold the slotting and scoring devices 18, 18ª and 20 in their upper positions and spaced from the blank. The upper ends of the cylinders of the motors are connected by the conduit c7, and through the valve V6 to the drain conduits c8 and c2. When the solenoid L2 is energized as described, the movable valve element is moved toward the right. This connects the header c3 through the valve to the conduit c7 connected with the upper ends of the motor cylinders. At the same time the lower ends of the motor cylinders are connected through the conduit c6 and through the valve to the drain conduits c8 and c2. Thus pressure is applied to the upper ends of the motor cylinders to move them downwardly and to thus cause the slotting and scoring devices 18, 18ª and 20 to move downwardly for slotting and scoring the blank. This occurs while the motor 80 and the feed rolls 14 and 16 are idle. The downward movement of the slotting and scoring devices opens the switch s7 to prevent any possible operation of the motor 80 and of the feed rolls. It will be understood that slotting and scoring is effected after the blank has been moved by the feed rollers by a distance representing the width of the box as determined by the setting of the gauge assembly 550.

After the elapse of the time delay relay period, the switches st1 and st11 are simultaneously opened by the solenoid Lt1, and as previously stated they are held in open positions until the blank has been completed. The opening of the switch st1 breaks the circuit for the solenoid L4 of the slow-down valve V4, thus removing the said solenoid from the control of the switch s9 which remains closed. The opening of the switch st11 breaks the circuit for the solenoid La which thereupon permits the opening of the switch s2a and the closing of the switch s1a. The opening of the switch s2a deenergizes the solenoid L2. The time delay is such that the solenoid L2 is not deenergized until the slotting and scoring devices have been moved to their lowermost positions. The deenergization of the solenoid L2 results in the movement of the movable element of the valve V6 to the position shown, thus reversing the action of the motors 158, 158 and lifting the slotting and scoring devices 18, 18ª and 20. The closing of the switch s1a closes the circuit for the solenoid L1, thus opening the valve V3 and permitting the motor 80 to start the movement of the feed rolls and the scoring rolls. Inasmuch as the switch s7 is also in the circuit for the solenoid L1, the said circuit cannot be completed until the slotting and scoring devices have reached their uppermost positions to close the said switch s7. The valve V4 has in the meanwhile been returned to its normal position upon the deenergization of the solenoid L4 by the opening of the switch st1 so that the motor 80 rotates the feed rolls and scoring rolls, the blank being again fed at full speed.

It will be seen that the said switch s1a and the parts controlled thereby constitute means for starting and stopping, that is, interrupting, the action of the motor 80 and of the feed rolls 14 and 16. It will also be seen that the switch s2a and the parts controlled thereby constitute means for operating the blank forming or slotting and scoring mechanism. By reason of the relationship of the said switches, the said blank forming or slotting and scoring mechanism is necessarily operated while the motor and the feed rolls are idle.

At the blank is again fed by the feed rolls after the first slotting and scoring operation, its leading edge engages the control elements F10 and F4 to close the switches s10 and s4. These switches function exactly as previously described with respect to the switches s3 and s9 and in so functioning they serve to effect the second slotting and scoring operation. The time delay solenoid Lt2 corresponds to the time delay solenoid Lt1; the switches st2 and st21 correspond to the switches st1 and st11; the solenoid Lb for the relay Rb corresponds to the solenoid La for the relay Ra; and the switches s1b and s2b correspond to the switches s1a and s2a.

As the blank is again fed by the feed rolls after the second slotting and scoring operation, its leading edge engages the control elements F11 and F5 to close the switches s5 and s11. These switches function exactly as previously described with respect to the switches s3 and s9 and in so functioning they serve to effect the third slotting and scoring operation. The time delay solenoid Lt3 corresponds to the time delay solenoid Lt1; the switches st3 and st31 correspond to the switches st1 and st11; the solenoid Lc for the relay Rc corresponds to the solenoid La for the relay Ra; and the switches s1d and s2d correspond to the switches s1a and s2a.

As the blank is again fed by the feed rollers after the third slotting and scoring operation, its leading edge engages the control elements F12 and F6 to close the switches s6 and s12. These switches function in a manner similar to that described with respect to the switches s3 and s9, except that the cut-off knife 320 is operated instead of the slotting and scoring devices 18, 18ª and 20. The time delay solenoid Lt4 corresponds to the time delay solenoid Lt1; the switches st4 and st41 correspond to the switches st1 and st11; the solenoid Ld for the relay Rd corresponds to the solenoid La for the relay Ra; and the switches s1d and s2d correspond to the switches s1a and s1b. The last-mentioned solenoids and switches function as previously described, with the exception of the switch s2d.

The previously mentioned solenoid L3 is connected in a circuit which comprises the terminal c, the conductors w1 and w2, the switch s2d, the conductor w23, the solenoid L3, the conductors w16 and w17, and the terminal a. The last described circuit is normally open by reason of the fact that the switch s2d is normally open. The solenoid L3 is therefore de-energized and the movable element of the valve V7 is in the position shown. The piston of the motor 342 is held in the position corresponding to the upper position of the cut-off knife 320. When the switch s2d is closed, the solenoid L3 is energized and the movable element of the valve V7 is moved to cause the motor 342 to move the knife 320 downwardly to effect cut-off.

By reason of the time delay in the opening of the switch st41, the switch s2d remains closed and the solenoid L3 remains energized until the knife 320 has moved to its lowermost position. Thereupon the switch s2d is opened and the solenoid L3 is de-energized to reverse the action of the motor 342 so as to return the knife 320 to its uppermost position. The switch s1d is closed simultaneously with the opening of the switch s2d, thus again starting the motor 80 and the feed rolls and scoring rolls.

It will be seen that the switch s1d and the parts controlled thereby also constitute means for starting and stopping, that is, interrupting, the action of the motor 80 and of the feed rolls 14 and 16. It will also be seen that the switch s2d and the parts controlled thereby constitute means for operating the cut-off mechanism. By reason of the relationship of the said switches, the said cut-off mechanism is necessarily operated while the motor and the feed rolls are idle.

As will be apparent from Fig. 7, the blank passes from between the feed rolls shortly after cut-off, but it remains engaged by the scoring rolls. The scoring rolls continue the feeding of the blank until the longitudinal score lines E4 and E5 have been completed. Thereafter the blank is moved by the kick-off mechanism described below.

*Kick-off mechanism*

When the blank has been completed it must be conducted to an out of the way place, that is, toward the end of the delivery apron 548 to be collected in a stack with other blanks or to be immediately folded to form boxes. To this end the kick-off device 26 is provided which consists of a narrow V-belt 608 (Figs. 5 and 10) mounted on spaced V-sheaves 610 with its upper run slightly above the plane of the apron. One of the pulleys 610 (Fig. 5) is fixed to one end of a shaft 612 journaled in a sleeve bearing 614. A pulley 616 is fastened to the opposite end of the shaft 610 and is connected by a belt 618 to a pulley 620 mounted on the shaft 622 of a speed rejection gear motor unit 624. The unit 624 is operated continuously during operation of the machine so that the upper run of the belt 608 is constantly traveling rearwardly along the apron 548. Above the apron or table and spaced from the upper run of the belt are small rolls 626 (Fig. 10) which hold the blank against the belt.

The kick-off device continues the movement of the blank as soon as it has passed from between the scoring rolls. As will be evident from Fig. 22, the switch s2 is beyond the scoring rolls. Therefore, the motor 80 and the feed rolls and scoring rolls continue to operate until the arm 103 of the switch 102 has been released to open the switch and break the circuits for the solenoids L5 and L1. The motor 80 and the feed rolls and the scoring rolls then stop, unless in the meantime the remaining portion of the sheet stock at the trailing end of the cut-off blank (or another sheet of stock) has been advanced to engage the arm 102 and close the switch s1 to maintain the circuit for the solenoid L5.

There is always a gap between the trailing edge of each completed blank and the leading edge of the next following portion of the sheet. This gap permits the several control elements F9, F3, F10, F4, F11, F5, F12 and F6 to be successively restored by their respective springs to their upright positions with the resultant opening of the several switches s9, s3, s10, s4, s11, s5, s12 and s6 and de-energization of the several solenoids Lt1, Lt2, Lt3 and Lt4. The de-energization of the said solenoids causes the closing of the several switches st1, st11, st2, st21, st3, st31, st4 and st41, the entire system thus being made ready for the next following blank. It will be understood that the said gap between the trailing edge of each completed blank and the leading edge of the next following portion of the sheet may be relatively small, it being merely necessary for the control elements to be released in succession prior to the successive re-engagements thereof.

GENERAL SUMMARY OF OPERATION

The machine is started and operated as follows to form blanks of a given size. First the push buttons for "width" and "depth" are manipulated to cause the motors 258 and 260 to traverse the longitudinal scoring rolls 22, 24 and 22a, 24a, the slotting devices 18 and 18a and the edge guides 350 and 352 so as to provide a blank B of given overall width and to properly locate the slotting devices and scoring rolls between the longitudinal edges of the blank. The pointers 276 and 290 and the scales 278 and 292 indicate when the said devices are in the desired positions. Next the gauge assemblies 550, 552, 554 and 556 are set by sliding them longitudinally as indicated by the respective index marks and scales, thereby placing the several control elements at distances corresponding to the lengths of the side and end walls of the intended box. Having adjusted the mechanism to make a blank of the desired size, the trimmer motor 112, the kick-off motor 624 and the motor pump unit 100 are started.

A strip or sheet of paper board is then placed with its end on the table 10 and with its right longitudinal edge against the edge guide 350 and is then pushed between the feed rolls 14 and 16. As the sheet advances its leading edge strikes and actuates the switch s1, thereby starting the feed rolls 14 and 16, as heretofore described, which grip the sheet to feed it rearwardly relatively to the trimmer which either splits the sheet or trims off a narrow edge thereof. As the sheet travels rearwardly, it encounters and passes between the upper and lower scoring rolls so that longitudinal spaced scoring lines E4 and E5 are formed thereon by the raised portions 312 (Fig. 4) of upper rolls 22 and 22a which mate with the respective grooves in the peripheries of the lower rolls 24 and 24a formed by the raised portions 314 and 316. Beyond the scoring rolls the leading edge of the blank strikes the first control element F9 which, as heretofore described, slows down the feed rolls so that the blank strikes the second control element F3 at a slower rate. The said control element F3 stops the feed rolls and the scoring rolls and effects operation of the slotting and transverse scoring means to bring them down onto the sheet so as to cut the slots N1, N1 and N2, N2 and form the transverse score line E3—E3 therebetween. The interlock s7 (Fig. 23) described heretofore, holds the feed rolls inoperative while the slotting and scoring means operate and then retract. Then the rolls resume rotation and the blank proceeds to the next pair of control elements F10, F4 whereupon the blank is again slowed down, stopped, slotted and again started. This is repeated again by the control elements F11, F5. Finally, when the blank reaches the control elements F12, F6, the feed rolls and scoring rolls are stopped and the transverse cutter bar 320 is actuated to cut off the blank from the remainder of the strip or sheet. Thereafter, the feed rolls and scoring rolls are again started, the scoring rolls continuing the feeding of the blank after it has passed beyond the feed rolls. Before the severed blank passes beyond the scoring rolls, it is engaged by the kick-off belt which then serves to move it toward the rear end of the delivery apron or table.

After the cutting-off operation is completed, the remaining portion of the sheet of stock, if long enough for another blank, is manually advanced to push its leading edge between the feed rolls and the above-described operations are repeated.

The left portion of the sheet which is cut off by the saw 104, if of sufficient width, may then be passed through the machine in the manner described to form another series of blanks.

By reason of the ready adjustability for changing the set-up according to the dimensions of the required blanks, the machine is particularly suited for the making of small quantities of blanks. Strips or sheets of stock of standard sizes may be used, no preliminary cutting or trimming operations being necessary. The making of blanks of a determined size can be discontinued at any time when the required number of such blanks has been completed, even though a portion of the strip or sheet remains unused. When the said unused portion of the strip or sheet is of sufficient size it can be used, after a new set-up, for the making of blanks of another size.

It should be understood that the present disclosure is for the purpose of illustration only and that this invention includes all modifications and equivalents which fall within the scope of the appended claims.

The invention claimed is:

1. In a machine for making a foldable box blank having a predetermined length, the combination of a support having a longitudinal pathway for a sheet of stock from which the blank is to be made, normally rotating opposed feed rolls above and below the pathway for engaging said sheet to feed it longitudinally along the said pathway which rolls have their axes in fixed positions so that the said rolls remain in engagement with the sheet, transversely extending slotting and scoring means adjacent the said pathway and normally out of sheet engaging position which means is spaced in the leading direction from the said feed rolls, a plurality of means located in positions which are longitudinally spaced from each other by less than said blank length and dependent upon the feeding of the sheet by the feed rolls for successively arresting and restarting the rotation of all of the said feed rolls so as to effect interruptions of sheet feeding with the sheet in a plurality of successive positions similarly spaced longitudinally, and means automatically operable successively by the last said means and during each of a plurality of the said interruptions of sheet feeding and while the sheet is held by the arrested feed rolls for moving the slotting and scoring means into and out of engagement with the sheet so as to effect transverse slotting and scoring at a plurality of longitudinally spaced locations between the leading and trailing edges of the blank.

2. In a machine for making a foldable box blank having a predetermined length, the combination of a support having a longitudinal pathway for a sheet of stock from which the blank is to be made, normally rotating feed rolls for engaging the sheet to feed it longitudinally along the said pathway which feed rolls have their axes in fixed positions so that the rolls remain in engagement with the sheet, transverse scoring means adjacent the said pathway and normally out of sheet engaging position, means dependent upon feeding of the sheet to a predetermined position for interrupting the rotation of the feed rolls so as to thereby interrupt the feeding of the sheet and for moving the scoring means into and out of engagement with the sheet to form a transverse score line between the leading and trailing edges of the blank while sheet feeding is interrupted, and means for again interrupting the rotation of the feed rolls so as to thereby again interrupt the feeding of the sheet and for again moving the scoring means into and out of engagement with the sheet to form a second transverse score line between the first said transverse score line and the trailing edge of the blank while sheet feeding is interrupted which last said means is dependent for its operation upon the subsequent feeding of said sheet to a second predetermined position which is spaced from the first said position by less than said blank length.

3. In a machine for making a foldable box blank having a predetermined length, the combination of a support having a longitudinal pathway for a sheet of stock from which the blank is to be made, normally moving means for engaging the sheet to feed it longitudinally along the said pathway, transverse slotting and scoring means adjacent the said pathway and normally out of sheet engaging position, two control means positioned for successive actuation by the leading edge of the sheet as it is fed longitudinally which means are longitudinally spaced from each other by less than said blank length, means dependent upon the actuation of the control means first to be actuated for interrupting the movement of the feeding means and for thereby interrupting the feeding of the sheet and for also moving the slotting and scoring means so as to form transverse slots with a connecting score line between the leading and trailing edges of the blank while sheet feeding is interrupted, and means dependent upon the actuation of the control means to be next actuated for again interrupting the movement of the feeding means and for thereby again interrupting the feeding of the sheet and for again moving the slotting and scoring means so as to form other transverse slots with a connecting score line between the first said slots and score line and the trailing edge of the blank while sheet feeding is again interrupted.

4. In a machine for making a foldable box blank having a predetermined length, the combination of a support having a straight longitudinal pathway for a sheet of stock from which the blank is to be made, normally rotating opposed feed rolls above and below the pathway for engaging the sheet to feed it longitudinally along the said pathway which rolls have their axes in normally fixed positions so that the said rolls remain in engagement with the sheet, transversely extending slotting and scoring means adjacent the said pathway and normally out of sheet engaging position, transversely extending cut-off means adjacent said pathway and normally out of sheet engaging position which means is adapted for severing a blank in said pathway from the trailing portion of the sheet and is spaced in the trailing direction from the feed rolls, means dependent upon the feeding of the sheet by the feed rolls for successively arresting and restarting the rotation of all of the said feed rolls so as to effect interruptions of sheet feeding with the sheet in a plurality of successive positions longitudinally spaced from each other by less than said blank length, means automatically operable during one interruption of sheet feeding and while the sheet is held by the arrested feed rolls for moving the slotting and scoring means into and out of engagement with the sheet so as to effect transverse slotting and scoring at a location between the leading and trailing edges of the blank, and means automatically operable during another interruption of sheet feeding and while the sheet is held by the arrested feed rolls for moving the cut-off means into and out of engagement with the sheet so as to sever the blank from the trailing portion of the sheet at the trailing edge of the said blank.

5. In a machine for making a foldable box blank having a predetermined length, the combination of a support having a straight longitudinal pathway for a sheet of stock from which the blank is to be made, normally moving means for engaging the sheet to feed it longitudinally along the said pathway, transversely extending blank forming means adjacent the said pathway and normally out of sheet engaging position, transversely extending cut-off means adjacent the pathway for transversely severing a blank from the trailing portion of the sheet which means is spaced in the trailing direction from the blank forming means and is normally out of sheet engaging position, means dependent upon feeding the leading edge of the sheet to a predetermined position for interrupting the movement of the feeding means and for moving the blank forming means into and out of engagement with the sheet to effect blank forming between the leading and trailing edges of the blank while feeding is interrupted, and means for again interrupting the movement of the feeding means and for moving the cut-off means into and out of engagement with the sheet to effect cut-off at the trailing edge of the blank while feeding is interrupted which last said means is dependent for its operation upon the subsequent feeding of said leading edge of the sheet to a second predetermined position which is spaced from the first said position by less than said blank length.

6. In a machine for making a foldable box blank having a predetermined length, the combination of a support having a straight longitudinal pathway for a sheet of stock from which a blank is to be made, normally moving means for feeding the sheet longitudinally along the said pathway, transversely extending downwardly and upwardly movable blank forming means adjacent the said pathway and normally in its upper position, transversely extending cut-off means adjacent the pathway for transversely severing a blank from the trailing portion of the sheet which means is normally out of sheet engaging position, at least two longitudinally spaced control means positioned for actuation in succession by the leading edge of the sheet as the said sheet is fed longitudinally, means operable upon the actuation of said control means for successively interrupting the normal movement of the feeding means and for thereby interrupting the feeding of the sheet with said sheet located successively in at least two positions all longitudinally spaced from each other less than said blank length, means operable upon the actuation of the control means first to be actuated for moving the blank forming means downwardly to effect blank forming between the leading and trailing edges of the blank while feeding is interrupted and for then moving the blank forming means upwardly, and means operable upon the actuation of another control means for moving the cut-off means into engagement with the sheet to effect cut-off of the blank while feeding is interrupted and for then moving the said cut-off means out of engagement with the blank.

7. In a machine for making a foldable box blank having a predetermined length, the combination of a support having a straight longitudinal pathway for a sheet of stock from which a blank is to be made, normally moving means for feeding the sheet longitudinally along the said pathway, transversely extending downwardly and upwardly movable blank forming means adjacent the said pathway and normally in its upper position, transversely extending cut-off means adjacent the pathway for transversely severing a blank from the trailing portion of the sheet which means is spaced in the trailing direction from the blank forming means and is normally out of sheet engaging position, at least two control means positioned for actuation in succession by the leading edge of the sheet as the said sheet is fed longitudinally which means are longitudinally spaced from each other by less than said blank length, means operable upon the actuation of each control means for interrupting the movement of the feeding means and for thereby interrupting the feeding of the sheet, means operable upon the actuation of one control means for first moving the blank forming means downwardly to effect blank forming between the leading and trailing edges of the blank while feeding is interrupted and for then moving the blank forming means upwardly, and means subsequently operable upon the actuation of another control means for first moving the cut-off means into engagement with the sheet to effect cut-off while feeding is interrupted and for then moving the said cut-off means out of engagement with the blank.

8. In a machine for making a foldable box blank having a predetermined length, the combination of a support having a longitudinal pathway for a sheet of stock from which the blank is to be made, normally rotating opposed feed rolls above and below the sheet for engaging it to feed it longitudinally along the said pathway which rolls have their axes in fixed positions so that the said rolls remain in engagement with the sheet, transversely extending scoring means adjacent the said pathway and normally out of sheet engaging position which means is spaced in the leading direction from the said feed rolls, cut-off means adjacent said pathway and normally out of sheet engaging position which means is adapted for severing a blank from the trailing portion of the sheet, the said cut-off means being spaced in the trailing direction from the feed rolls and from the said scoring means and being so spaced from the latter by a distance substantially less than the length of the blank, means dependent upon the feeding of the sheet by the feed rolls for successively arresting and restarting the rotation of all of the said feed rolls so as to effect interruptions of sheet feeding with the sheet in a plurality of successive longitudinally spaced positions, the leading and trailing of the said positions being spaced from each other by a distance substantially less than the length of the blank, means automatically operable during each of a plurality of the said interruptions of sheet feeding and while the sheet is held by the arrested feed rolls for moving the scoring means into and out of engagement with the sheet so as to effect transverse scoring at a plurality of longitudinally spaced locations between the leading and trailing edges of the blank, and means automatically operable during another of the said interruptions of sheet feeding and while the sheet is held by the arrested feed rolls for moving the cut-off means into and out of engagement with the sheet so as to sever the blank from the trailing portion of the sheet at the trailing edge of the said blank.

9. In a machine for making a foldable blank for a box, the combination of a support having a longitudinal pathway for a sheet of stock from which the blank is to be made, normally rotating feed rolls for engaging the sheet to feed it longitudinally along the said pathway which feed rolls have their axes in fixed positions so that the rolls remain in engagement with the sheet, transverse scoring means adjacent the said pathway and normally out of sheet engaging position, cut-off means adjacent the pathway for transversely severing a blank from the trailing portion of the sheet which means is spaced in the trailing direction from the scoring means and is normally out of sheet engaging position, means dependent upon the feeding of the sheet to a predetermined position for interrupting the rotation of the feed rolls so as to thereby interrupt the feeding of the sheet and for moving the scoring means into and out of engagement with the sheet to form a transverse score line between the leading and trailing edges of the blank while feeding is interrupted, means dependent upon the feeding of the sheet to a second predetermined position for again interrupting the rotation of the feed rolls so as to thereby again interrupt the feeding of the sheet and for again moving the scoring means into and out of engagement with the sheet to form a second transverse score line between the first said transverse score line and the trailing edge of the blank while feeding is interrupted, and means dependent upon the feeding of the sheet to a third predetermined position for again interrupting the rotation of the feed rolls so as to thereby again interrupt the feeding of the sheet and for moving the cut-off means into and out of engagement with the sheet to effect cut-off at the trailing edge of the blank while feeding is interrupted.

10. A machine for forming from successive portions of a strip of stock a plurality of foldable box blanks each having a predetermined length, said machine comprising a support forming a pathway for the strip, feeding means for moving the strip along said support, a control system for starting and stopping said feeding means thereby to regulate the progress of the strip along the pathway, and a plurality of instrumentalities whose movement is regulated by said control system including cut-off means movable relatively to the support to sever the respective blanks from the strip and slotting and scoring means movable relatively to the support to slot and score the respective blanks, said control system including at least three control elements disposed along said support so as to be successively engaged by the strip as it traverses said pathway, said control elements being longitudinally spaced from each other by less than said blank length and each of said elements being interconnected with said control system to stop said feeding means upon the engagement thereof by said strip, said slotting and scoring means being operated by said control system subsequent to the stopping of said feeding means by any but the last of said control elements, the last of said control elements effectuating the control system to operate the cut-off means subsequent to the stopping of said feeding means.

11. In a machine for making a foldable blank for a box, the combination of a support having a longitudinal pathway for a sheet of stock from which the blank is to be made, normally rotating feed rolls for engaging the sheet to feed it longitudinally along the said pathway which feed rolls have their axes in fixed positions so that the rolls remain in engagement with the sheet, transverse slotting and scoring means adjacent the said pathway and normally out of sheet engaging position, at least two control means positioned for actuation by the leading edge of the sheet as it is fed longitudinally which control means are longitudinally spaced for successive actuation and are adjustable longitudinally and relatively to each other to provide the required longitudinal dimensions of the blank, means dependent upon the actuation of the first control means to be actuated for interrupting the rotation of the feed rolls so as to thereby interrupt the feeding of the sheet and for also moving the slotting and scoring means so as to form transverse slots with a connecting score line between the leading and trailing edges of the blank while sheet feeding is interrupted, and means dependent upon the actuation of a subsequently actuated control means for again interrupting the rotation of the feed rolls so as to thereby again interrupt the feeding of the sheet and for also again moving the slotting and scoring means so as to form other transverse slots with a connecting score line between the first said slots and score lines and the trailing edge of the blank while sheet feeding is interrupted.

12. In a machine for making a foldable blank for a box, the combination of a support having a longitudinal pathway for a sheet of stock from which the blank is to be made, normally moving means for engaging the sheet to feed it longitudinally along the said pathway, transverse slotting and scoring means adjacent the said pathway and normally out of sheet engaging position, cut-off means adjacent the pathway for transversely severing a completed blank which means is spaced in the trailing direction from the slotting and scoring means and is normally out of sheet engaging position, at least three control means positioned for actuation by the leading edge of the sheet as it is fed longitudinally which control means are longitudinally spaced for successive actuation and are adjustable longitudinally and relatively to each other to provide the required longitudinal dimensions of the blank, means dependent upon the actuation of the first control means to be actuated for interrupting the movement of the feeding means so as to thereby interrupt the feeding of the sheet and for also moving the slotting and scoring means so as to form transverse slots with a connecting score line between the leading and trailing edges of the blank while sheet feeding is interrupted, means dependent upon the actuation of a subsequently actuated control means for again interrupting the movement of the feeding means so as to thereby again interrupt the feeding of the sheet and for also again moving the slotting and scoring means so as to form other transverse slots with a connecting score line between the first said slots and score line and the trailing edge of the blank while sheet feeding is interrupted, and means dependent upon the actuation of a subsequent actuated control means for again interrupting the movement of the feeding means so as to again interrupt the feeding of the sheet and for moving the cut-off means into and out of engagement with the sheet to effect cut-off at the trailing edge of the blank while sheet feeding is interrupted.

13. A machine for making a blank for a box of the type having a foldable body portion and foldable flaps which machine comprises a support forming a pathway over which a sheet of stock can travel, feeding means for moving the sheet along said support, slotting and scoring means movable relatively to said support to slot and score said stock, cut-off means movable relatively to said support, a control system for starting and stopping said feeding means thereby to regulate the progress of the stock, and a plurality of control elements disposed in spaced relationship along said support so as to be successively engaged by the stock as it traverses along said pathway which control elements are adjustable longitudinally and relatively to each other to provide the required longitudinal dimensions of the blank, the said elements being interconnected with said control system to stop operation of said feeding means upon the engaging thereof by the stock and each of them except the last serving to operate said slotting and scoring means subsequent to each corresponding stopping of said feeding means and the last said control element being interconnected with the control system to operate said cut-off means subsequent to the last stopping of said feeding means.

14. In a machine for making a foldable blank for a box, the combination of a support having a longitudinal pathway for a sheet of stock from which the blank is to be made, normally moving means for engaging the sheet to feed it longitudinally along the said pathway, a plurality of instrumentalities adjacent the support and adapted to engage and act upon the sheet, operating mechanism for interrupting the movement of the feeding means and for causing the said instrumentalities to act successively on the sheet at various longitudinally spaced locations thereon, a plurality of transversely spaced longitudinal guideways at the leading side of the said feeding means and of the said instrumentalities, a plurality of gauging assemblies engaged with and longitudinally adjustable along the respective guideways, each of the said assemblies including a control element positioned to be engaged and relatively moved by the leading edge of the sheet, and connections between the said control elements and the operating mechanism serving upon the relative movement of each element to cause the operating mechanism to interrupt the movement of the feeding means and to cause one of the said instrumentalities to act upon the sheet while feeding is interrupted.

15. A machine as set forth in claim 14, wherein each gauging assembly includes a device for releasably clamping the said assembly to the corresponding guideway to prevent longitudinal movement, which clamping device is a manually operable element accessible at the top of the assembly for effecting clamping and releasing.

16. A machine as set forth in claim 14, wherein each gauging assembly includes an electric switch operable by the control element, and wherein each corresponding connection with the operating means includes electrical conductors connected with the switch.

17. A machine for making a blank for a box of the type having a foldable body portion and foldable flaps comprising a pathway over which a sheet of stock travels, which machine comprises slotting and scoring means movable relatively to said pathway and operable to slot and score said stock so as to define the flaps and corners of the box to be formed from the blank, a plurality of longitudinally adjustable gauges having scales which can be set to respective index marks in positions corresponding to the desired dimensions respectively of the box blank to be made, the index mark for the first gauge being relatively stationary with respect to the pathway and the index marks for subsequent gauges being moved conjointly as the preceding gauge is set, and means associating said gauges and said slotting and scoring means and whose operation is successively initiated by the stock when in gauged positions for effecting a predetermined sequence of operations of said slotting and scoring means at predetermined locations on said stock in its course of travel along said pathway.

18. In a machine for making a foldable blank for a box, the combination of a support having a longitudinal pathway for a sheet of stock from which the blank is to be made, normally moving means for engaging the sheet to feed it longitudinally along the said pathway, transverse slotting and scoring means adjacent the said pathway and normally out of sheet engaging position, cut-off means adjacent the pathway for transversely severing a blank from the trailing portion of the sheet which means is spaced in the trailing direction from the slotting and scoring means and is normally out of sheet engaging position, at least three control means positioned for actuation by the leading edge of the sheet as it is fed longitudinally which control means are longitudinally spaced for successive actuation and are adjustable longitudinally and relatively to each other to provide the required longitudinal dimensions of the blank, means dependent upon the actuation of the first control means to be actuated for interrupting the movement of the feeding means and for also moving the slotting and scoring means so as to form transverse slots with connecting score lines between the leading and trailing edges of the blank while feeding is interrupted, means dependent upon the actuation of a subsequently actuated control means for again interrupting the movement of the feeding means and for also again moving the slotting and scoring means so as to form other transverse slots with connecting score lines between the first said slots and score lines and the trailing edge of the blank while feeding is interrupted, means dependent upon the actuation of a subsequently actuated control means for again interrupting the movement of the feeding means and for moving the cut-off means into and out of engagement with the sheet to effect cut-off at the trailing edge of the blank while feeding is interrupted, and relatively movable scales and index marks respectively associated with the said longitudinally adjustable control means, the scale and index mark for the first control means to be actuated indicating the position of the said control means with respect to the pathway and the scale and index mark for each other control means indicating the position of the said control means with respect to the next preceding control means.

19. In a machine for making a foldable blank for a box, the combination of a support having a longitudinal pathway for a sheet of stock from which a blank is to be made, normally moving means for feeding the sheet longitudinally along the said pathway, downwardly and upwardly movable slotting and scoring means adjacent the said pathway and normally in its upper position, cut-off means adjacent the pathway for transversely severing a blank from the trailing portion of the sheet which means is spaced in the trailing direction from the slotting and scoring means and is normally out of sheet engaging position, at least two longitudinally spaced control means positioned for actuation in succession by the leading edge of the sheet as it is fed longitudinally, means operable upon the actuation of each control means for first reducing the speed of movement of the feeding means and for then stopping the said movement, means automatically operable after the stopping of the movement of the feeding means for causing the resumption of such movement, means operable upon the actuation of one control means for first moving the slotting and scoring means downwardly to effect slotting and scoring between the leading and trailing edges of the blank while feeding is stopped and for then moving the slotting and scoring means upwardly, and means operable upon the actuation of a subsequently actuated control means for first moving the cut-off means into engagement with the sheet to effect cut-off while feeding is stopped and for then moving the said cut-off means out of engagement with the blank.

20. In a machine for making a foldable box blank having a predetermined length, the combination of a support having a longitudinal pathway for a sheet of stock from which the blank is to be made, normally rotating opposed feed rolls above and below the sheet for engaging it to feed it longitudinally along the said pathway which rolls have their axes in normally fixed positions so that the said rolls remain in engagement with the sheet, transversely extending slotting and scoring means adjacent the said pathway and normally out of sheet engaging position which means is spaced in the leading direction from the said feed rolls, a plurality of longitudinally spaced feed roll control means dependent upon the feeding of the sheet by the feed rolls and operable successively after sheet feeding to predetermined longitudinally spaced positions, the leading and trailing of the said positions being spaced from each other by a distance substantially less than the length of the blank, each of the said means serving upon each operation thereof to first reduce the speed of rotation of the feed rolls and to then arrest the said rotation so as to first reduce the speed of sheet feeding and to then effect interruption thereof and the said means thereafter serving to restart rotation of the feed rolls so as to effect resumption of sheet feeding, and means automatically operable by the successive feed roll control means during the corresponding interruptions of sheet feeding and while the sheet is held by the arrested feed rolls for moving the slotting and scoring means into and out of engagement with the sheet so as to effect transverse slotting and scoring at a plurality of longitudinally spaced locations between the leading and trailing edges of the blank.

21. In a machine for making a foldable box blank having a predetermined length, the combination of a support having a longitudinal pathway for a sheet of stock from which the blank is to be made, normally rotating opposed feed rolls above and below the sheet for engaging it to feed it longitudinally along the said pathway which rolls have their axes in normally fixed positions so that the said rolls remain in engagement with the sheet, transversely extending slotting and scoring means adjacent the said pathway and normally out of sheet engaging position which means is spaced in the leading direction from the said feed rolls, cut-off means adjacent the pathway for transversely severing a blank from the trailing portion of the sheet which means is spaced in the trailing direction from the feed rolls and is normally out of sheet engaging position, feed roll control means dependent upon the feeding of the sheet by the feed rolls and operable successively after sheet feeding to predetermined longitudinally spaced positions, the leading and trailing of the said positions being spaced from each other by a distance substantially less than the length of the blank, the said means serving upon each operation thereof to first reduce the speed of rotation of the feed rolls and to then arrest the said rotation so as to first reduce the speed of sheet feeding and to then effect interruption thereof and the said means thereafter serving to restart rotation of the feed rolls so as to effect resumption of sheet feeding, means automatically operable during each of a plurality of the said interruptions of sheet feeding and while the sheet is held by the arrested feed rolls for moving the slotting and scoring means into and out of engagement with the sheet so as to effect transverse slotting and scoring at a plurality of longitudinally spaced locations between the leading and trailing edges of the blank, and means automatically operable during another interruption of sheet feeding for first moving the cut-off means into engagement with the sheet to effect cut-off while feeding is interrupted and for then moving the said cut-off means out of engagement with the blank.

22. In a machine for making a foldable blank for a box, the combination of a support having a longitudinal pathway for a sheet of stock from which a blank is to be made, feed rolls for engaging the sheet to feed it longitudinally along the said pathway, a normally operating hydraulic motor connected with the feed rolls for rotating them, a valve for controlling operation of the said motor, blank forming means adjacent and normally above the said pathway, a normally idle hydraulic motor connected with the blank forming means for moving it downwardly, a second valve for controlling the operation of the second said motor, control means including an electric switch operably dependent upon the feeding of the sheet by the feed rolls, electrical means dependent upon the operation of the said switch by the leading edge of the sheet as it is fed longitudinally for interrupting the movement of the first motor and of the feed rolls, and electrical means also operable upon the operation of the said switch to actuate the second said valve while the movement of the first motor and of the feed rolls is interrupted so as to cause the operation of the second motor and so as to thereby move the blank forming means downwardly to effect blank forming.

23. In a machine for making a foldable blank for a box, the combination of a support having a longitudinal pathway for a sheet of stock from which a blank is to be made, feed rolls for engaging the sheet to feed it longitudinally along the said pathway, a normally operating hydraulic motor connected with the feed rolls for rotating them, a valve for controlling operation of the said motor, blank forming means adjacent and normally above the said pathway, a normally idle hydraulic motor connected with the blank forming means for moving it downwardly, a second valve for controlling the operation of the second said motor, control means including an electric switch and positioned for actuation of the said switch by the leading edge of the sheet as it is fed longitudinally, electrical means operable upon the actuation of the said switch to actuate the first said valve for interrupting the movement of the first motor and of the feed rolls, and electrical means also operable upon the actuation of the said switch to actuate the second said valve while the movement of the first motor and of the feed rolls is interrupted so as to cause the operation of the second motor and so as to thereby move the blank forming means downwardly to effect blank forming between the leading and trailing edges of the blank.

24. In a machine for making a foldable blank for a box, the combination of a support having a longitudinal pathway for a sheet of stock from which a blank is to be made, normally moving feed rolls for engaging the sheet to feed it longitudinally along the said pathway, a normally operating hydraulic motor connected with the feed rolls for rotating them, a valve for controlling operation of the said motor, blank forming means adjacent and normally above the said pathway, a normally idle hydraulic motor connected with the blank forming means for moving it first downwardly and then upwardly, a second valve for controlling the operation of the second said motor, control means including an electric switch and positioned for actuation of the said switch by the leading edge of the sheet as it is fed longitudinally, electrical means operable upon the actuation of the said switch to actuate the first said valve for stopping the first motor and the feed rolls and for thereby stopping the feeding of the sheet, the said electrical means serving automatically to subsequently actuate the first said valve to start the first motor and the feed rolls and thus resume the feeding of the sheet, and electrical means also operable upon the actuation of the said switch to actuate the second said valve for causing the operation of the second said motor to first move the blank forming means downwardly so as to effect blank forming between the leading and trailing edges of the blank and then to move the blank forming means upwardly out of engagement with the sheet, the last said electrical means serving to effect movement of the blank forming means into and out of engagement with the sheet after the stopping of feeding and prior to the resumption of feeding.

25. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating first motor connected with the feed rolls for rotating them, downwardly and upwardly movable blank forming means adjacent the said pathway and normally in its upper position, a normally idle second motor connected with the blank forming means for moving it first downwardly and then upwardly, cut-off means adjacent the pathway for transversely severing a blank from the trailing portion of the sheet which means is spaced in the trailing direction from the blank forming means and is normally out of sheet engaging position, a normally idle third motor connected with the cut-off means for moving it into and out of sheet engaging position, at least two longitudinally spaced control means positioned for actuation in succession by the leading edge of the sheet as it is fed longitudinally, means operable upon the actuation of each control means for interrupting the movement of the first motor and of the feed rolls, means operable upon the actuation of one control means for causing the operation of the second motor while the movement of the first motor and of the feed rolls is interrupted so as to first move the blank forming means downwardly to effect blank forming between the leading and trailing edges of the blank and so as to then move the blank forming means upwardly, and means operable upon the actuation of a subsequently actuated control means for causing the operation of the third motor while the movement of the first motor and of the feed rolls is interrupted so as to move the cut-off means into engagement with the sheet to effect cut-off and so as to then move the cut-off means out of engagement with the blank.

26. In a machine for making a foldable blank for a box, the combination of a support having a longitudinal pathway for a sheet of stock from which a blank is to be made, normally rotating feed rolls for engaging the sheet to feed it longitudinally along the said pathway, a normally operating hydraulic motor connected with the feed rolls for rotating them, a valve for controlling operation of the said motor, downwardly and upwardly movable blank forming means adjacent the said pathway and normally in its upper position, a normally idle hydraulic motor connected with the blank forming means for moving it first downwardly and then upwardly, a second valve for controlling the operation of the second said motor, cut-off means adjacent the pathway for transversely severing a blank from the trailing portion of the sheet which means is spaced in the trailing direction from the blank forming means and is normally out of sheet engaging position, a normally idle hydraulic motor connected with the cut-off means for moving it into and out of sheet engaging position, a third valve for controlling the operation of the third said motor, at least two longitudinally spaced control means each including an electric switch and positioned for actuation in succession by the leading edge of the sheet as it is fed longitudinally, electrical means operable upon the actuation of each said switch for actuating the first said valve for interrupting the movement of the first motor and of the feed rolls, means operable upon the actuation of the switch of one control means for actuating the second said valve for causing the operation of the second said motor while the movement of the first motor and of the feed rolls is interrupted so as to move the blank forming means downwardly to effect blank forming between the leading and trailing edges of the blank and so as to then move the blank forming means upwardly out of engagement with the sheet, and means operable upon the actuatiton of the switch of a subsequently actuated control means for actuating the third said valve while the movement of the first motor and of the feed rolls is interrupted so as to cause the operation of the third said motor to move the cut-off means into engagement with the sheet to effect cut-off while the first motor and the feed rolls are idle and to then move said cut-off means out of engagement with the blank.

27. Mechanism for controlling instrumentalities performing successive operations upon a strip of sheet material to form a box blank having a predetermined length, said mechanism comprising means defining a pathway over which said strip travels, feeding means including a variable speed motor and feed rolls driven by the motor for advancing said strip along said pathway, an instrumentality along the pathway for operating upon the strip, a plurality of pairs of detectors disposed in longitudinally spaced relationship along said pathway which detectors are spaced from each other by less than said blank length, said detectors being sequentially responsive to the presence of said strip at predetermined longitudinally spaced points along said pathway, and means including electrical control circuits for said motor and for operating said instrumentality, said circuits being actuated by said detectors in response to the presence of the strip at any of the predetermined spaced points, the first detector of each pair regulating the control circuits to reduce the speed of the motor and feed rolls and the second detector of each pair subsequentially regulating the control circuits successively to arrest the action of said motor and feed rolls and to actuate said instrumentality and to restart said motor and feed rolls.

28. Mechanism for controlling instrumentalities performing successive operations upon a strip of sheet material to form a box blank having a predetermined length, said mechanism comprising means defining a pathway over which said strip travels, feeding means including a variable speed motor and feed rolls driven by the motor for advancing said strip along said pathway, a plurality of instrumentalities along the pathway for operating upon the strip, a plurality of pairs of detectors disposed in longitudinally spaced relationship along said pathway which detectors are spaced from each other by less than said blank length, said detectors being sequentially responsive to the presence of said strip at predetermined longitudinally spaced points along said pathway, and means including electrical control circuits for said motor and for operating said instrumentalities, said circuits being actuated by said detectors in response to the presence of the strip at any of the predetermined spaced points, the first detector of each pair regulating the control circuits to reduce the speed of the motor and feed rolls and the second detector of each pair subsequentially regulating the control circuits successively to arrest the action of said motor and feed rolls and to actuate a corresponding instrumentality and to restart said motor and feed rolls.

29. Mechanism for controlling instrumentalities performing successive operations upon a strip of sheet material to form a box blank having a predetermined length, said mechanism comprising means defining a pathway over which said strip travels, feeding means including a variable speed hydraulic motor and feed rolls driven by the motor for advancing said strip along said pathway, a plurality of instrumentalities along the pathway for operating upon the strip, a hydraulic system for driving said motor, a plurality of pairs of detectors disposed in longitudinally spaced relationship along said pathway which detectors are spaced from each other by less than said blank length, said detectors being sequentially responsive to the presence of said strip at predetermined longitudinally spaced points along said pathway, and control means for said hydraulic system actuated by said detectors in response to the presence of the strip at any of the said predetermined spaced points, the first detector of each pair regulating the control means for the hydraulic system to reduce the speed of the motor and feed rolls and the second detector of each pair regulating the control means successively to arrest the action of said motor and feed rolls and to actuate a corresponding operating instrumentality and to restart said motor and feed rolls.

30. In a machine for making a box blank having a predetermined length, feeding means for moving a strip of stock in a path through said machine, driving means including a motor for operating said feeding means, an instrumentality arranged to slot and score the strip transversely, a plurality of pairs of switches which switches are longitudinally spaced along said path by less than the length of the blank, the first switch of each pair operating to reduce the speed of the driving motor and the feeding means and the second switch of each pair operating to stop the driving motor and the feeding means and conconcomitantly to actuate the said instrumentality, and interlocking switching means operable by said instrumentality upon the completion of the slotting and scoring to restart the driving motor and the feeding means, said pairs of switches being longitudinally adjustable and operatively correlated with the passage of the strip along its path so that successive slots and score lines are formed by the said instrumentality and are spaced in accordance with the spacing of said pairs of switches and the length-width dimensions of the box blank to be formed.

31. In a machine for making a blank for a box, feeding means for moving a strip of stock in a path through said machine, driving means including a pump and a hydraulic motor driven thereby for operating said feeding means, an instrumentality arranged to slot and score the strip transversely, a plurality of pairs of switches which pairs are longitudinally spaced along the said path, the first switch of each pair operating to increase the motor discharge pressure thus reducing the speed of the motor and of the feeding means so as to reduce the speed of movement of the said strip, the second switch of each pair operating to block the discharge of the motor thus stopping the motor and the feeding means so as to stop the movement of the strip and the said second switch serving concomitantly to actuate the said instrumentality, and interlocking switching means operable by said instrumentality upon the completion of the slotting and scoring to open the discharge of the motor to start the motor and the feeding means and to thereby start movement of the strip, said pairs of switches being operatively correlated with the passage of the strip along its path so that successive slots and score lines are formed by the said instrumentality and are spaced in accordance with the length-width dimensions of the box blank to be formed.

32. In a machine for making a blank for a box, feeding means for moving a strip of stock in a path through said machine, driving means including a hydraulic motor for operating said feeding means, a pump for supplying fluid under pressure to said motor and a discharge conduit for conducting the fluid away from said motor, an instrumentality arranged adjacent said path to slot and score the strip transversely, a plurality of pairs of switches which pairs are longitudinally spaced along the said path, a solenoid valve connected in the discharge conduit and operated by the first switch of each pair to increase the motor discharge pressure thus reducing the speed of the motor and feeding means so as to reduce the speed of movement of the said strip, a second solenoid valve connected in the discharge conduit and operated by the second switch of each pair to block the discharge conduit thus stopping the motor and the feeding means so as to stop the movement of the said strip and the said second switch serving to actuate the said instrumentality, and interlocking means operable by said instrumentality upon the completion of the slotting and scoring to open the discharge of the motor to start the motor and the feeding means and to thereby start movement of the strip, said pairs of switches being operatively correlated with the passage of the strip along said path so that successive slots and score lines are formed by the said instrumentality and are spaced in accordance with the length-width dimensions of the box blank to be formed.

33. In a machine for making a foldable blank for a box, the combination of a support having a longitudinal pathway for a sheet of stock from which the blank is to be made, means for engaging the sheet to feed it longitudinally along the said pathway, a motor for operating the feeding means, blank forming means adjacent the said pathway and operable to engage and from the sheet at successive longitudinally spaced positions therealong, an electric circuit for controlling the operation of the motor which circuit includes two initially open switches connected in parallel, a trip means spaced in the trailing direction from the feeding means and positioned to be engaged and moved by a sheet as it is moved toward the feeding means, the said trip means serving upon movement to close one of the switches and thereby start the operation of the motor and of the feeding means, means dependent upon the feeding of the sheet by the feeding means for arresting and restarting the movement of the said feeding means so as to effect an interruption of sheet feeding, means automatically operable during the said interruption of sheet feeding and while the sheet is held by the arrested feeding means for moving the blank forming means into and out of engagement with the sheet at a position between the leading and trailing edges of the blank, and a second trip means spaced in the leading direction from the feeding means and from the blank forming means and positioned to be engaged and moved by a sheet as it is moved by the feeding means, the second trip means serving upon movement to close the other switch and thereby maintain the operation of the motor and the feeding means after the sheet has released the first said trip means with resultant opening of the first switch.

34. A machine as set forth in claim 33, wherein scoring rolls are provided for longitudinally scoring the sheet which scoring rolls are driven by the motor in unison with the feeding means and are spaced in the leading direction from the said feeding means, and wherein the second said trip means is spaced in the leading direction from the said scoring rolls.

35. In a machine for making a blank for a box, means for feeding a strip of fiberboard along a path, instrumentalities including slotting, scoring and cut-off means arranged in the path to slot and score the strip transversely and then to cut it clear across to separate a blank from the succeeding strip, power-operated means drivably connected to the feeding means, said power-operated means being normally inactive in the absence of a strip of paper board in the machine, trip means in the path of the strip and spaced in the trailing directon from the feeding means which trip means is operable by the leading edge of the strip to initiate operation of the power-operated means and hence the feeding means, means dependent upon the feeding of the sheet by the feeding means for arresting and restarting the movement of the said feeding means so as to effect an interruption of sheet feeding, means automatically operable during the said interruption of sheet feeding and while the sheet is held by the arrested feeding means for moving the blank forming means into and out of engagement with the sheet at a position between the leading and trailing edges of the blank, and supplementary means spaced in the leading direction from the said slotting, scoring and cut-off means and spaced in the leading direction from the said trip means a distance appreciably less than the shortest overall length of a blank to be formed for insuring continued operation of the power-operated means and hence the feed rolls until the blank is completed.

36. In a machine for making a foldable blank for a box, the combination of a support having a longitudinal pathway for a sheet of stock from which the blank is to be made, means for engaging the sheet to feed it longitudinally along the said pathway, a hydraulic motor for operating the feeding means, a normally operating pump, a hydraulic connection from the pump to the motor, an initially open by-pass for the said hydraulic connection, an electrically operable means for closing the by-pass, blank forming means adjacent the said pathway and operable to engage and form the sheet at successive longitudinally spaced positions therealong, an electric circuit for controlling the operation of the said electrically operable means which circuit includes an initially open switch, and a trip means spaced in the trailing direction from the feeding means and positioned to be engaged and moved by a sheet as it is moved toward the feeding means, the said trip means serving upon movement to close the switch and thereby operate the electrically operable means so as to close the by-pass and permit liquid to flow from the pump into the hydraulic connection to the motor.

37. In a machine for making a foldable blank for a box, the combination of a support having a longitudinal pathway for a sheet of stock from which the blank is to be made, means for engaging the sheet to feed it longitudinally along the said pathway, a hydraulic motor for operating the feeding means, a normally operating pump, a hydraulic connection from the pump to the motor, an initially open by-pass for the said hydraulic connection, an electrically operable means for closing the by-pass, blank forming means adjacent the said pathway and operable to engage and form the sheet at successive longitudinally spaced positions therealong, means including an electric circuit for controlling the operation of the motor which circuit includes an initially open switch, an electric circuit for controlling the operation of the said electrically operable means which circuit also includes the aforesaid initially open switch, and a trip means spaced in the trailing direction from the feeding means and positioned to be engaged and moved by a sheet as it is moved toward the feeding means which trip means serves upon movement to close the switch, the said switch upon closing serving to cause operation of the electrically operable means so as to close the by-pass and permit liquid to flow from the pump into the hydraulic connection to the motor and the said switch upon closing also serving to cause the operation of the motor by fluid delivered from the pump.

38. In a machine for making a foldable blank for a box, the combination of a support having a longitudinal pathway for a sheet of stock from which the blank is to be made, means for engaging the sheet to feed it longitudinally along the said pathway, a hydraulic motor for operating the feeding means, a normally operating pump, a hydraulic connection from the pump to the motor, an initially open by-pass for the said hydraulic connection, an electrically operable means for closing the by-pass, blank forming means adjacent the said pathway and operable to engage and form the sheet at successive longitudinally spaced positions therealong, an electric circuit for controlling the operation of the said electrically operable means which circuit includes two initially open switches connected in parallel, a trip means spaced in the trailing direction from the feeding means and positioned to be engaged and moved by a sheet as it is moved toward the feeding means, the said trip means serving upon movement to close one of the switches and thereby operate the electrically operable means so as to close the by-pass and permit liquid to flow from the pump into the hydraulic connection to the motor, and a second trip means spaced in the leading direction from the feeding means and positioned to be engaged and moved by a sheet as it is moved from the feeding means, the second trip means serving upon movement to close the other switch and thereby maintain the by-pass closed after the sheet has released the first said trip means with resultant opening of the first switch.

39. In a machine for making a foldable blank for a box, the combination of a support having a longitudinal pathway for a sheet of stock from which the blank is to be made, means for engaging the sheet to feed it longitudinally along the said pathway, a hydraulic motor for operating the feeding means, a normally operating pump, a hydraulic connection from the pump to the motor, an initially open by-pass for the said hydraulic connection, an electrically operable means for closing the by-pass, blank forming means adjacent the said pathway and operable to engage and form the sheet at successive longitudinally spaced positions therealong, means including an electric circuit for controlling the operation of the said electrically operable means which circuit includes two initially open switches connected in parallel, means including an electric circuit for controlling the operation of the motor which circuit also includes the aforesaid initially open switches, a trip means spaced in the trailing direction from the feeding means and positioned to be engaged and moved by a sheet as it is moved toward the feeding means which trip means serves upon movement to close one of the switches, the said switch upon closing serving to cause operation of the electrically operable means so as to close the by-pass and permit liquid to flow from the pump into the hydraulic connection to the motor and the said switch upon closing also serving to cause the operation of the motor by fluid delivered from the pump, and a second trip means spaced in the leading direction from the feeding means and positioned to be engaged and moved by a sheet as it is moved from the feeding means which trip means serves upon movement to close the other switch, the last said switch upon closing serving to maintain the by-pass closed and also to maintain the operation of the motor after the sheet has released the first trip means with resultant opening of the first switch.

40. In a machine for making a foldable box blank having a predetermined length, the combination of a support having a longitudinal pathway for a sheet of stock from which the blank is to be made, first and second sets of normally rotating feed rolls for engaging the sheet to feed it longitudinally along the said pathway which rolls have their axes in normally fixed positions so that the said rolls remain in engagement with the sheet, the feed rolls of the second set being longitudinally spaced in the leading direction from the rolls of the first set by a distance less than the length of the blank and the feed rolls of one of the said sets being arranged in pairs and formed and positioned for longitudinally scoring the blank as it passes between them, a transverse slotting and scoring means adjacent the said pathway and normally out of sheet engaging position, the said slotting and scoring means being spaced in the leading direction from the feed rolls of the first set and in the trailing direction from the feed rolls of the second set, means dependent upon the feeding of the sheet by the feed rolls for arresting and restarting the rotation of all of the said feed rolls so as to effect an interruption of sheet feeding, and means automatically operable during the said interruption of sheet feeding and while the sheet is held by the arrested feed rolls for moving the slotting and scoring means into and out of engagement with the sheet so as to effect transverse slotting and scoring at a location between the leading and trailing edges of the blank, the said feed rolls of the second set serving to feed the blank after slotting and scoring thereof and after it has passed beyond the feed rolls of the first set.

41. A machine as set forth in claim 40, wherein a normally moving means is provided adjacent the feed rolls of the second set and operable to engage the blank and move it in the leading direction after it has passed beyond the said feed rolls of the second set.

42. In a machine for making a foldable box blank having a predetermined length, the combination of a support having a longitudinal pathway for a sheet of stock from which the blank is to be made, first and second sets of normally rotating feed rolls for engaging the sheet to feed it longitudinally along the said pathway which rolls have their axes in normally fixed positions so that the said rolls remain in engagement with the sheet, the feed rolls of the second set being longitudinally spaced in the leading direction from the rolls of the first set by a distance less than the length of the blank and the feed rolls of one of the said sets being arranged in pairs and formed and positioned for longitudinally scoring the blank as it passes between them, a transverse slotting and scoring means adjacent the said pathway and normally out of sheet engaging position, the said means being spaced in the leading direction from the feed rolls of the first set and in the trailing direction from the feed rolls of the second set, cut-off means adjacent the pathway for transversely severing a blank from the trailing portion of the sheet which means is spaced in the trailing direction from the feed rolls of the first set and is normally out of sheet engaging position, means dependent upon the feeding of the sheet by the feed rolls for successively arresting and restarting the rotation of all of the said feed rolls so as to effect interruptions of sheet feeding with the sheet in a plurality of successive longitudinally spaced positions, the leading and trailing of the said positions being spaced from each other by a distance substantially less than the length of the blank, means automatically operable during one interruption of sheet feeding and while the sheet is held by the arrested feed rolls for moving the slotting and scoring means into and out of engagement with the sheet so as to effect transverse slotting and scoring at a location between the leading and trailing edges of the blank, and means automatically operable during another interruption of sheet feeding and while the sheet is held by the arrested feed rolls for moving the cut-off means into and out of engagement with the sheet so as to sever the blank from the trailing portion of the sheet at the trailing edge of the said blank, the said feed rolls of the second set serving to feed the blank after cut-off and after it has passed beyond the feed rolls of the first set.

43. In a machine for making a foldable box blank having a predetermined length, the combination of a support having a longitudinal pathway for a sheet of stock from which the blank is to be made, normally rotating feed rolls for engaging the sheet to feed it longitudinally along the said pathway, a transverse slotting and scoring means adjacent the said pathway and spaced in the leading direction from the feed rolls which means is normally out of sheet engaging position, pairs of opposed rotatable scoring rolls connected for rotation in unison with the feed rolls and positioned for longitudinally scoring the blank which rolls are spaced in the leading direction from the said feed rolls and from the said slotting and scoring means and is so spaced from the feed rolls by a distance less than the length of the blank, cut-off means adjacent the pathway for transversely severing a blank from the trailing portion of the sheet which means is spaced in the trailing direction from the feed rolls and is normally out of sheet engaging position, means dependent upon feeding of the sheet to a predetermined position for stopping the rotation of the feed rolls and the scoring rolls and for then moving the slotting and scoring means into and out of engagement with the sheet to effect transverse slotting and scoring between the ends of the blank and for then starting the rotation of the feeding rolls and scoring rolls, and means dependent upon the feeding of the sheet to a second predetermined position for again stopping the rotation of the feed rolls and the scoring rolls and for then moving the cut-off means into and out of engagement with the sheet to effect cut-off and for then again starting the rotation of the feed rolls and the scoring rolls, the said scoring rolls serving to feed the blank after it has passed beyond the feed rolls.

44. A machine as set forth in claim 43, wherein a normally moving means is provided adjacent the scoring rolls and operable to engage the blank and move it in the leading direction after it has passed beyond the scoring rolls.

45. In a machine for making a foldable box blank having a predetermined length, the combination of a support having a longitudinal pathway for a sheet of stock from which the blank is to be made, first and second sets of normally rotating feed rolls for engaging the sheet to feed it longitudinally along the said pathway which rolls have their axes in normally fixed positions so that the said rolls remain in engagement with the sheet, the feed rolls of the second set being longitudinally spaced in the leading direction from the rolls of the first set by a distance less than the length of the blank and the feed rolls of one of the said sets being arranged in pairs and formed and positioned for longitudinally scoring the blank as it passes between them, a transverse slotting and scoring means adjacent the said pathway and normally out of sheet engaging position, the said slotting and scoring means being spaced in the leading direction from the feed rolls of the first set and in the trailing direction from the feed rolls of the second set, means dependent upon the feeding of the sheet by the feed rolls for successively arresting and restarting the rotation of all of the said feed rolls so as to effect interruptions of sheet feeding with the sheet in a plurality of successive longitudinally spaced positions, the leading and trailing of the said positions being spaced from each other by a distance substantially less than the length of the blank, and means automatically operable during each of a plurality of the said interruptions of sheet feeding and while the sheet is held by the arrested feed rolls for moving the slotting and scoring means into and out of engagement with the sheet so as to effect transverse slotting and scoring at a plurality of longitudinally spaced locations between the leading and trailing edges of the blank, the said feed rolls of the second set serving to feed the blank after slotting and scoring and after it has passed beyond the feed rolls of the first set.

46. In a machine for making a foldable box blank having a predetermined length, the combination of a support having a longitudinal pathway for a sheet of stock from which the blank is to be made, first and second sets of normally rotating feed rolls for engaging the sheet to feed it longitudinally along the said pathway which rolls have their axes in normally fixed positions so that the said rolls remain in engagement with the sheet, the feed rolls of the second set being longitudinally spaced in the leading direction from the rolls of the first set by a distance less than the length of the blank and the feed rolls of one of the said sets being arranged in pairs and formed and positioned for longitudinally scoring the blank as it passes between them, a transverse slotting and scoring means adjacent the said pathway and normally out of sheet engaging position, the said means being spaced in the leading direction from the feed rolls of the first set and in the trailing direction from the feed rolls of the second set, cut-off means adjacent the pathway for transversely severing a blank from the trailing portion of the sheet which means is spaced in the trailing direction from the feed rolls of the first set and is normally out of sheet engaging position, means dependent upon the feeding of the sheet by the feed rolls for successively arresting and restarting the rotation of all of the said feed rolls so as to effect interruptions of sheet feeding with the sheet in a plurality of successive longitudinally spaced positions, the leading and trailing of the said positions being spaced from each other by a distance substantially less than the length of the blank, means automatically operable during each of a plurality of the said interruptions of sheet feeding and while the sheet is held by the arrested feed rolls for moving the scoring means into and out of engagement with the sheet so as to effect transverse scoring at a plurality of longitudinally spaced positions between the leading and trailing edges of the blank, and means automatically operable during another of the said interruptions of sheet feeding and while the sheet is held by the arrested feed rolls for moving the cut-off means into and out of engagement with the sheet so as to sever the blank from the trailing portion of the sheet at the trailing edge of the said blank, the said feed rolls of the second set serving to feed the blank after cut-off and after it has passed beyond the feed rolls of the first set.

47. In a machine for making a foldable blank for a box, the combination of a support having a longitudinal pathway for a sheet of stock from which the blank is to be made, means for engaging the sheet to feed it longitudinally along the said pathway, slotting and scoring means adjacent the said pathway and operable to engage the sheet to slot and score it at successive longitudinally spaced positions therealong, an edge guide in a longitudinal plane at one side of the effective portions of the slotting and scoring means for engaging one longitudinal edge of the sheet and for guiding the said sheet as it is fed, the said edge guide having a portion spaced in the leading direction from the slotting and scoring means and having another portion spaced in the trailing direction from the said means, and a trimming cutter transversely spaced from the said longitudinal plane of the edge guide and located in a second longitudinal plane at the opposite side of the effective portions of the slotting and scoring means which cutter is operable to cut the sheet longitudinally as it is fed and as it is guided by the said edge guide and the said cutter thus serving to provide a predetermined transverse dimension for the blanks, the said cutter being directly opposite the last said portion of the edge guide and being spaced in the trailing direction from the said feeding means and from the said slotting and scoring means so that said feeding means and said slotting and scoring means engage previously trimmed portions of the blank.

48. In a machine for making a foldable blank for a box, the combination of a support having a longitudinal pathway for a sheet of stock from which the blank is to be made, normally moving means for engaging the sheet to feed it longitudinally along the said pathway, slotting and scoring means adjacent the said pathway, cut-off means adjacent the pathway for transversely severing a completed blank which means is spaced in the trailing direction from the slotting and scoring means, means dependent upon feeding of the sheet to a predetermined position for interrupting the movement of the feeding means and for moving the slotting and scoring means to effect slotting and scoring between the leading and trailing edges of the blank while feeding is interrupted, means dependent upon the feeding of the sheet by the feeding means for successively arresting and restarting the movement of the said feeding means so as to effect interruptions of sheet feeding with the sheet in a plurality of successive longitudinally spaced positions, means automatically operable during one interruption of sheet feeding for moving the scoring and slotting means into and out of engagement with the sheet so as to effect transverse scoring and slotting at a position between the leading and trailing edges of the blank, means automatically operable during another interruption of sheet feeding for moving the cut-off means into and out of engagement with the sheet so as to sever the blank from the trailing portion of the sheet at the trailing edge of the said blank, an edge guide in a longitudinal plane at one side of the effective portions of the slotting and scoring means for engaging one longitudinal edge of the sheet and for guiding the said sheet as it is fed, and a cutter transversely spaced from the said longitudinal plane of the edge guide and located in a second longitudinal plane at the opposite side of the effective portions of the slotting and scoring means which cutter is operable to cut the sheet longitudinally as it is fed and as it is guided by the said edge guide and the said cutter thus serving to provide a predetermined transverse dimension for the blanks, the said cutter being spaced in the trailing direction from the said feeding means and from the said slotting and scoring means and the said cutter having its effective portion closely adjacent the cut-off means but spaced slightly in the trailing direction therefrom so that the said cut-off means and the said cutter cooperate to entirely sever the completed blank from the trailing portion and from the lateral portion of the sheet.

49. In a machine for making a foldable blank for a box, the combination of a support having a longitudinal pathway for a sheet of stock from which the blank is to be made, means for engaging the sheet to feed it longitudinally along the said pathway, blank forming means adjacent the said pathway and operable to engage and form the sheet at successive longitudinally spaced positions therealong, an edge guide in a longitudinal plane at one side of the effective portions of the blank forming means for engaging one longitudinal edge of the sheet and for guiding the said sheet as it is fed, a cutter transversely spaced from the said longitudinal plane of the edge guide and located in a second longitudinal plane at the opposite side of the effective portions of the blank forming means, the said cutter being operable to cut the sheet longitudinally as it is fed and as it is guided by the said edge guide and the said cutter thus serving to provide a predetermined transverse dimension for the blanks, and a frame carrying all of the aforesaid parts and having upper and lower portions which frame is entirely open between the said portions at the side remote from the edge guide and adjacent the cutter in order to permit the movement through the machine of stock of indefinite width.

50. For use in a machine for forming a blank for a box, slotting means for the blank comprising in combination, a block supported for vertical reciprocation, said block having a transverse groove in the bottom thereof, a transverse scoring bar having an upper portion positioned within and fitting said groove in the block, two transverse knife holders fastened to the block at opposite sides of the scoring bar, said holders being provided with parts that interengage with parts of the scoring bar to prevent separation of said bar from said block, and two transverse knives secured respectively to said holders and extending below the scoring bar in spaced relationship with each other to form the sides of the slot in the blank.

51. In a machine for forming a blank for a box, means for slotting and scoring the blank comprising two blocks, means for reciprocatingly supporting the blocks to move conjointly towards and from the blank, a scoring bar carried by said blocks to engage and crease said blank as the blocks are moved, the said blocks being longitudinally adjustable along the bar, a pair of spaced slotting knives fastened respectively to each of said blocks, the knives of each pair being located on either side of the scoring bar and extending below the level of the effective portion of the bar to cut slots in the blank at either end of the crease formed by the scoring bar, and a third knife located at the inner end of each block and located in part directly below the scoring bar for forming the inner end of the corresponding slot.

52. In a machine for making a blank for a box, means for feeding a strip of fiberboard along a path, transversely spaced scoring rolls for forming spaced score lines longitudinally of the board, slotting knives adjacent to said rolls and operative to slot the board at an angle to the score lines formed by said rolls, means for simultaneously adjusting the scoring rolls and slotting knives in unison transversely of the path of the stock while maintaining a fixed spacing between the said scoring rolls and a fixed spacing between the said slotting knives, and means for simultaneously adjusting the scoring rolls relatively to each other and the slotting knives relatively to each other so as to uniformly and equally change the spacing between the said scoring rolls and the spacing between the said slotting knives.

53. In a machine for cutting from a strip of stock a box blank including connected side and end walls the transverse dimensions of which walls are the box depth and the longitudinal dimension of which end walls are the box width, said box blank also including top and bottom flaps attached to said side and end walls and having their transverse dimensions no greater than said box width, said machine comprising in combination a support along which the stock is fed, means for feeding the stock, transversely spaced slotting cutters and a transverse scoring bar for forming slots from the longitudinal edges of the stock inwardly and a score line between the inner ends thereof of the said slots, means supporting the slotting cutters and scoring bar for movement into and out of the path of movement of the stock, scoring rolls mounted adjacent said slotting cutters and relatively adjustable transversely of the path of travel of the stock, means for adjusting the slotting cutters transversely relatively to each other and relatively to the scoring bar and for simultaneously adjusting the scoring rolls transversely relatively to each other so as to uniformly and equally change the spacings between the said slotting cutters and between the said scoring rolls and so as to thus change the depth dimension of the box blank, and means for adjusting the slotting cutters transversely and for simultaneously adjusting the scoring rolls transversely while maintaining a fixed spacing between the said slotting cutters and a fixed spacing between the said scoring rolls so as to change the width dimensions of the flaps of the box blank.

54. In a machine for cutting a blank for a box from a strip of stock, a support for the strip of stock, a transversely adjustable longitudinally extending edge guide along which the stock is fed and guided, means for feeding the stock longitudinally, two transversely spaced scorers for forming parallel score lines longitudinally of the strip, two transversely spaced slotting cutters and a transverse scoring bar for forming slots from the longitudinal edges of the stock inwardly to the respective longitudinal score lines and a transverse score line between the inner ends of the slots, means supporting the slotting cutters and scoring bar for movement into and out of the path of movement of the stock, means arranged selectively to transversely adjust the scorers and associated slotting cutters either conjointly with respect to the support or relatively to each other, and means for transversely adjusting the edge guide simultaneously with the conjoint movement of the scorers and cutters and simultaneously with the relative movement of the scorers and slotters.

55. In a machine for making a foldable box blank including connected side and end walls the transverse dimensions of which walls are the box depth and the longitudinal dimension of which end walls are the box width, said box blank also including top and bottom flaps attached to said side and end walls and having their transverse dimensions no greater than said box width, said machine comprising in combination a support having a longitudinal pathway for a sheet of stock from which the blank is to be made, means for longitudinally feeding the sheet, two transversely extending and transversely spaced slotting cutters, a transverse scoring bar effective between the slotting cutters, means for moving the cutters and the scoring bar relatively to the support to effect transverse slotting and scoring, two pairs of upper and lower longitudinal scoring rolls transversely spaced in conformity with the spacing between the inner ends of the slotting cutters, the inner end of one of the slotting cutters and the scoring rolls of the corresponding pair having a spacing from a fixed longitudinal plane at one edge of the blank which is equal to the transverse dimension of the box flaps, an edge guide for the opposite edge of the sheet which edge guide has a spacing from the inner end of the other cutter and the scoring rolls of the other pair which is also equal to the transverse dimension of the box flaps, and means for adjusting the slotting cutters and the scoring rolls of both pairs in unison transversely and relatively to the said fixed plane and for simultaneously adjusting the edge guide in the same direction and to twice the extent whereby the aforesaid spacings are changed equally to provide box flaps having different widths.

56. A machine as set forth in claim 55, wherein means is provided for adjusting the edge guide and the adjacent slotting cutter and the adjacent scoring rolls transversely and in unison with each other and relatively to the other slotting cutter and the other scoring rolls in order to provide a different box depth.

57. In a machine for making a foldable blank for a box, the combination of a supporting plate for a sheet of stock which plate has a longitudinal vertical face at one side and which plate has a transverse slot open at the said longitudinal face, means for engaging the sheet to feed it longitudinally along the top of the said plate, a longitudinal edge guide adjacent the top of the said plate and spaced transversely from the said longitudinal face, transversely spaced slotting cutters vertically movable into and out of the said slot in the plate to cut transverse slots in the sheet, the said cutters being transversely adjustable in opposite directions to positions wherein their outer end portions project respectively beyond the said longitudinal face of the plate and beyond the longitudinal plane of the edge guide, and a rotary cutter positioned to slit the sheet as it is fed which cutter is positioned adjacent the said longitudinal face of the plate and is spaced in the trailing direction from the said feeding means and the said slotting cutters, the said cutter by reason of its said spacing slitting the sheet before it is engaged by the cutters with the result that the portion of the sheet projecting laterally beyond the plate is free to move downwardly so as to be out of the path of movement of the adjacent slotting cutter when the said cutter projects beyond the plate.

58. In a machine for cutting a blank for a box from a strip of stock, a support, an adjustable edge guide along which the stock is fed, means for feeding the stock, a pair of upper scoring rolls in spaced relationship, a pair of lower scoring rolls which cooperate with the upper rolls to form parallel score lines longitudinally of the strip, two transversely spaced slotting cutters and a scoring bar for forming slots from the longitudinal edges of the stock inwardly to the respective longitudinal score lines and a transverse score line between the inner ends of the slots, two upper carriages moving the respective slotting cutters and associated upper rolls for movement transversely of the path of movement of the stock two lower carriages for moving the respective lower rolls for movement transversely of the path of movement of the stock, lead screw means for conjointly moving both the upper and lower carriages in unison with respect to the support, and other lead screw means for conjointly moving the upper and lower carriages nearer to the edge guide with respect to the upper and lower carriages further from the guide, said guide being moved by both said lead screw means.

59. In a machine for making a blank for a box, means for feeding a strip of stock along a given path, a guide for one edge of said strip, two spaced slotting members arranged transversely of the path for forming aligned slots in the strip from its edges inwardly to define the end flaps of the box to be formed and at intervals along the strip corresponding to the longitudinal wall dimensions of the box, scoring means for forming a score line running from the inner end of one slot to the inner end of the other slot, two spaced upper scoring rolls, two lower scoring rolls associated with the upper scoring rolls to form spaced longitudinal score lines lengthwise of the strip parallel to its edges and intersecting the inner ends of the slots at each side of the strip, a pair of upper carriages for moving the respective upper scoring rolls and associated slotting members transversely of direction in which the stock is fed, a pair of lower carriages for moving the respective lower scoring rolls, the pairs of carriages being connected respectively by lead screws each having one end which is axially restrained with respect to one of the carriages, the opposite end of each screw threadingly engaging the other carriage whereby rotation of the screw moves the carriages relatively to each other, each pair of carriages being supported respectively upon two rotatable shafts, one of the shafts passing through one of the carriages and having a threaded end engaging the other carriage whereby rotation of the shaft conjointly moves the carriages relative to the path, gear means connecting the other shaft with the corresponding lead screw so that they rotate conjointly, driving means interconnecting the threaded shafts carrying the upper and lower carriages simultaneously to move the upper and lower scoring rolls and slotting members with respect to the path, and further driving means for interconnecting the other shafts simultaneously to move one upper and lower scoring roll and slotting member with respect to the other upper and lower scoring roll and associated slotting member.

60. A machine for making a blank for a box according to claim 59, wherein a carriage is provided for said guide for moving the edge of the strip, a shaft passing through the lower scoring roll carriages for supporting the guide carriage, a lead screw having one end axially fixed with respect to the guide carriage and the other end threadingly engaging one of the lower scoring roll carriages whereby the edge guide carriage and lower scoring roll carriage move conjointly as the scoring roll carriage is moved relatively to the other lower scoring roll carriage, and gear means for interconnecting the supporting shaft for the edge guide carriage and the lead screw, said supporting shaft being driven conjointly by the driving means for the threaded shafts whereby the edge guide carriage moves with respect to the lower scoring roll carriages as the lower scoring roll carriages are moved conjointly with respect to the path.

References Cited in the file of this patent

UNITED STATES PATENTS

| 1,067,253 | Inman | July 15, 1913 |
| 1,286,714 | Moore | Dec. 3, 1918 |
| 1,367,675 | Tibbitts | Feb. 8, 1921 |
| 1,379,275 | Moore | May 24, 1921 |
| 1,435,979 | Reed | Nov. 21, 1922 |
| 1,534,125 | Ladd | Apr. 21, 1925 |
| 1,702,763 | Clark | Feb. 19, 1929 |
| 1,723,149 | Gannon | Aug. 6, 1929 |
| 1,916,845 | Leland | July 4, 1933 |
| 1,986,769 | Farley et al. | Jan. 1, 1935 |
| 1,987,816 | Bowman | Jan. 15, 1935 |
| 2,003,027 | Wright | May 28, 1935 |
| 2,301,028 | Esch | Nov. 3, 1942 |
| 2,323,673 | Myberg | July 6, 1943 |
| 2,444,050 | Knowlton et al. | June 29, 1948 |
| 2,458,867 | Messersmith | Jan. 11, 1949 |
| 2,462,513 | Kucklinsky | Feb. 22, 1949 |